(12) United States Patent
Ben-Shachar et al.

(10) Patent No.: US 9,274,529 B2
(45) Date of Patent: Mar. 1, 2016

(54) SAFE EMERGENCY LANDING OF A UAV

(71) Applicant: Elbit Systems, LTD, Haifa (IL)

(72) Inventors: Eyal Ben-Shachar, Moshav Bnei Dror (IL); Reuven Godel, Ashdod (IL); Roy Mor, Tel Aviv (IL)

(73) Assignee: Elbit Systems, LTD., Haifa (IL)

( * ) Notice: Subject to any disclaimer, the term of this patent is extended or adjusted under 35 U.S.C. 154(b) by 0 days.

(21) Appl. No.: 14/380,949

(22) PCT Filed: Feb. 21, 2013

(86) PCT No.: PCT/IL2013/050157
§ 371 (c)(1),
(2) Date: Aug. 26, 2014

(87) PCT Pub. No.: WO2013/124852
PCT Pub. Date: Aug. 29, 2013

(65) Prior Publication Data
US 2015/0153740 A1  Jun. 4, 2015

(30) Foreign Application Priority Data
Feb. 26, 2012  (IL) .......................................... 218327

(51) Int. Cl.
*G05D 1/00* (2006.01)
*G05D 1/10* (2006.01)
(Continued)

(52) U.S. Cl.
CPC .............. *G05D 1/105* (2013.01); *B64C 39/024* (2013.01); *G05D 1/0072* (2013.01); *G05D 1/0088* (2013.01); *G05D 1/0676* (2013.01); *B64C 2201/141* (2013.01)

(58) Field of Classification Search
CPC ... G05D 1/105; G05D 1/0088; G05D 1/0072; B64C 39/024; B64C 2201/141
See application file for complete search history.

(56) References Cited

U.S. PATENT DOCUMENTS

2008/0147309 A1* 6/2008 Ivansson ................ G05D 1/105
  701/4
2008/0167762 A1* 7/2008 Duranti et al. .................. 701/11
(Continued)

FOREIGN PATENT DOCUMENTS

| CN | 101944295 | 1/2011 |
| EP | 1847896 | 10/2007 |
| WO | 2008/130453 | 10/2008 |

OTHER PUBLICATIONS

Notification Concerning and the International Preliminary Report on Patentability and Written Opinion for International Application No. PCT/IL2013/050157; Sep. 4, 2014; 8 pages.

(Continued)

*Primary Examiner* — Jonathan M Dager
(74) *Attorney, Agent, or Firm* — Gearhart Law LLC

(57) ABSTRACT

Method for autonomous safe emergency landing of a powered unmanned aerial vehicle (UAV) in the event of an engine failure. A landing approach trajectory is generated, including a downwind leg, initiating at an initiation point of the trajectory, an upwind leg, terminating at a selected touchdown point, and a U-turn leg, joining between the downwind leg and the upwind leg. The UAV is directed to the initiation point to follow the downwind leg. A glide ratio of the UAV is repeatedly determined based on current flight conditions. A current turning point is repeatedly determined along the downwind leg based on the determined glide ratio, the U-turn leg initiating at the current turning point. When the UAV arrives at the current turning point, the UAV is directed to follow the U-turn leg and the upwind leg, for landing the UAV at the selected touchdown point.

18 Claims, 7 Drawing Sheets

(51) Int. Cl.
  *G05D 1/06* (2006.01)
  *B64C 39/02* (2006.01)

(56) References Cited

U.S. PATENT DOCUMENTS

2011/0288714 A1* 11/2011 Flohr .................. G05D 1/0011
                                                    701/27
2013/0009013 A1*  1/2013 Bourakov ............. B64D 17/00
                                                    244/186
2013/0013135 A1*  1/2013 Yakimenko ........... B64D 17/00
                                                    701/18

OTHER PUBLICATIONS

Eng, Pillar; Simulation of a Fixed-Wing UAV Forced Landing with Dynamic Path Planning; accessed at http://eprints.qut.edu.au; 2007; 11 pages.
International Search Report for International Application No. PCT/IL2013/050157; Jun. 16, 2013; 3 pages.

* cited by examiner

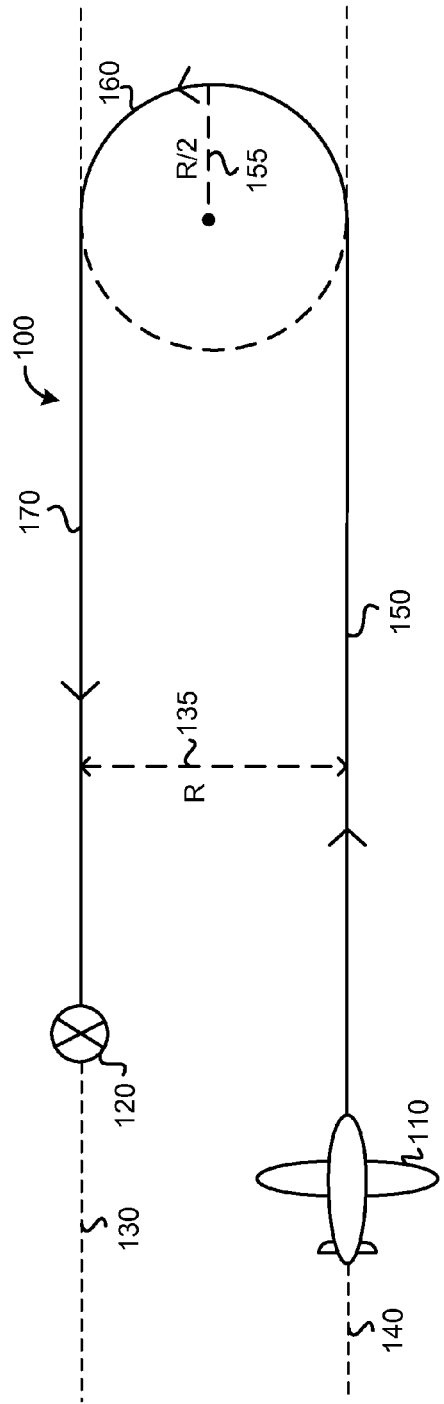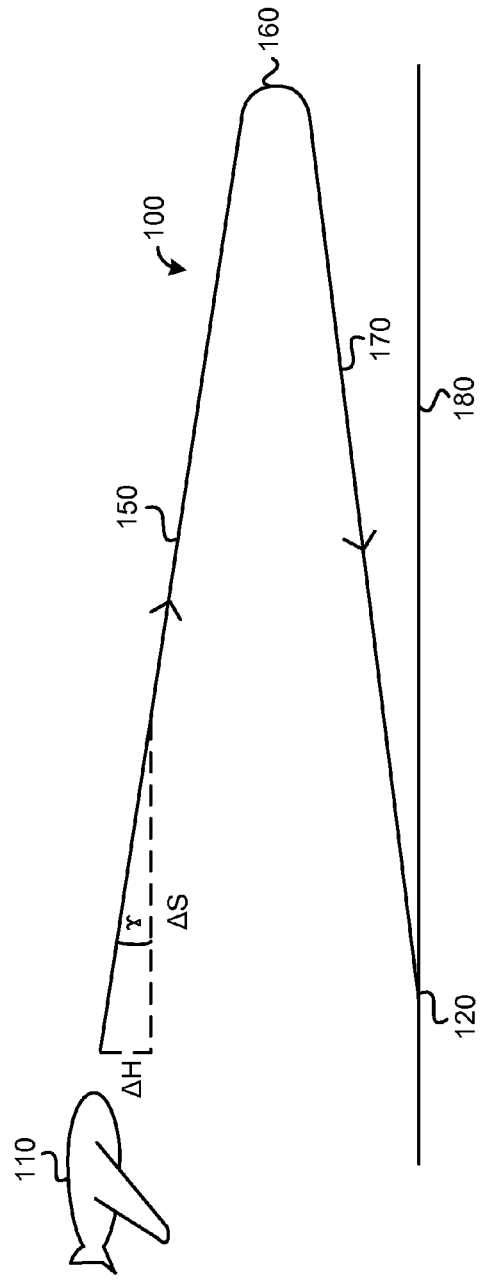
FIG. 2A
FIG. 2B

SAFE EMERGENCY LANDING OF A UAV

CROSS REFERENCE TO RELATED APPLICATION

This application is a national stage entry of PCT/IL2013/050157 filed on Feb. 21, 2013, which in turn claims the benefit of priority from Israel Patent Publication No. 218327 filed on Feb. 26, 2012. Each of the foregoing patent applications is incorporated by reference herein in its entirety for any purpose whatsoever.

FIELD OF THE DISCLOSED TECHNIQUE

The disclosed technique relates to the field of unmanned aerial vehicles (UAVs), in general, and to a system and method for safe emergency landing of a UAV in the event of an engine failure, in particular.

BACKGROUND OF THE DISCLOSED TECHNIQUE

The capabilities of UAVs have considerably developed such that UAVs are commonly used for various tasks and missions which are not necessarily military related. Nowadays, UAVs may be remotely controlled or autonomously operated on the basis of pre-programmed flight plans. However, a major drawback of a UAV is the possibility of loss of control of the UAV in the event of an acute technical failure, such as an engine failure, or such as the loss of communication with the operator of a remotely controlled UAV. In such cases, the UAV could eventually crash, thus posing a severe safety hazard, especially in the proximity of populated areas, in addition to the high cost of the resultant damage or complete loss of the UAV and its onboard systems. Therefore, authorized airspace for UAV flights is highly restricted and UAVs are generally not permitted to fly through civilian airspace. Such restrictions make it more difficult to operate a UAV and limit its potential uses.

Onboard autonomous systems may facilitate the continued controlled operation of the UAV and may assist flight and landing procedures, in the event of loss of communication with the UAV operator or in the event of an acute technical failure. Such systems are generally computer based systems which may, inter alia, determine flight routes for the UAV or select possible landing sites. Nevertheless, landing a UAV safely (safely for the surroundings and for the UAV), and moreover, landing a UAV safely in the event of an engine failure, is not a straightforward task. In addition to safety and damage prevention considerations, safe landing capability in such a scenario may contribute to fewer restrictions of UAV flights.

Reference is now made to FIG. 1, which is a top view schematic illustration of a trombone landing approach as known in the art, generally referenced 10. A trombone landing approach is a type of circling or curved landing approach or maneuver (also known as a "circle-to-land" maneuver), which is commonly employed by piloted aircrafts approaching an airport runway when straight-in landing is not feasible or desirable. There are several common patterns of circling approaches, which include several legs (flight segments) and one or more turns at different angles with respect to the runway or the preceding leg.

Trombone landing approach 10, as illustrated in FIG. 1, generally includes a downwind leg 30, a base leg 40 and an upwind leg 50. A piloted aircraft 20 is flying along trombone landing approach 10 in order to land on runway 70. Downwind leg 30 is substantially directed downwind and is substantially parallel to runway 70. Upwind leg 50 is substantially directed upwind and aligned with a centerline 60 of runway 70 to facilitate the landing of aircraft 20 on runway 70. Downwind leg 30 and upwind leg 50 are substantially straight and parallel. Base leg 40 allows aircraft 20 to perform a 180° turn from downwind leg 30 to upwind leg 50.

It should be noted that such a landing approach is commonly named "trombone" due to its geometry, which resembles the shape and manner of operation of a trombone musical instrument. The musical instrument includes a telescopic slide which allows the player to vary the length of its tube in order to produce different pitches. In the same manner, different landing approaches may be obtained by varying the length of the downwind leg of a trombone-shaped landing approach. Thus, a trombone landing approach is highly advantageous for air traffic controllers at airports when spacing between aircrafts is required, as this landing approach provides flexibility by adjustment of the downwind leg length.

Curved and circling approaches have been also used in the prior art as landing approaches for piloted aircrafts in the event of an engine failure (also known as: "glide approach", "forced landing approach" or "180° power-off approach"). These approaches are used by pilots, commonly during flight training on light planes, in order to execute power-off landings.

U.S. Pat. No. 7,689,328, to Spinelli, entitled "Determining Suitable Areas for Off-Airport Landing", discloses a system and a method for facilitating a safe emergency landing of a piloted aircraft or a UAV operated manually or automatically. The system includes a route analysis and planning tool which utilizes a routing algorithm to process information such as GPS data, aircraft instrumentation data and performance parameters. In a flight planning mode, the route analysis and planning tool may provide information about attainable and safe landing areas and information about the route to such a landing area. During in flight (real time) mode, the aircraft systems may provide information regarding the position, speed, heading and altitude of the aircraft, and wind speed. The route data may also be based on current data provided by the aircraft systems and may include Safe Options Limit (SOL) information and Vertical Trend Indicators (VTI). The SOL envelope provides information about the current engine out glide limits and available landing sites, accordingly. The VTI show the effect of a configuration change on the glide distance. The aircraft's systems may include an aircraft performance auto learning system. In operation, the auto learning system may utilize aircraft performance algorithms to generate performance data from flight maneuvers. The systems continue to update the performance data using current flight data.

U.S. Pat. No. 6,573,841 to Price, entitled "Glide Range Depiction for Electronic Flight Instrument Displays" discloses a method for depicting a glide range for a piloted aircraft after an engine failure. A display depicts a safe glide range. The pilot may select an airport within the glide range for emergency landing. The safe glide range is continuously computed and based on weather and wind information, airspeed, heading and computation of theoretical glide altitude, the last of which considers, at least, the aircraft's altitude and glide ratio. Additional information which may affect the glide ratio may be considered. Such information may be stored and recalled or determined by sensors.

U.S. Pat. No. 7,512,462 to Nichols et al., entitled "Automatic Contingency Generator" discloses an automatic contingency generator (ACG) for UAVs, preferably autonomous, for automatically determining a contingent route in response to contingencies experienced by the UAV, such as engine failure. The ACG continuously generates new routes to alternative destination points. In determining such routes, the ACG uses the energy state of the UAV, including relative altitude. The energy state is used to determine the UAV's glide range and to identify candidate landing locations within the glide range. Forecasted and actual wind data are used to dynamically adapt all routes for wind effects on the turn radius and climb/descent performance capabilities. The ACG may construct a route to an approach pattern or to a designated runway (including approach). Approach patterns may be stored as a part of the mission data.

U.S. Pat. No. 7,330,781 to Artini et al., entitled "Method to Determine and Guide Aircraft Approach Trajectory", discloses a method to guide a piloted aircraft and automatically determine a transition point between a first trajectory and a second trajectory, for which a tactical landing is carried out, and so as to reach the initial point of the second trajectory under predetermined flight conditions. The trajectories are in the form of straight line segments. The predetermined flight conditions include, at least: speed, altitude, aerodynamic configuration of the aircraft, and rate of deceleration.

U.S. Pat. No. 6,438,469 to Dwyer et al., entitled "Flight Control System and Method for an Aircraft Circle-to-Land Maneuver" discloses a flight control system and method for designing and controlling a circle-to-land (CTL) maneuver of a piloted aircraft using an airborne area navigator. The pilot selects a runway which would be used for landing. The system determines an appropriate CTL maneuver according to received input, including position data, aircraft velocity data and atmospheric conditions. In addition, the system is configured to receive pre-entered or real-time data from the pilot such as the turn radius and the final approach length.

Civil Aviation Authority of New Zealand, "Forced Landing Practice", VECTOR—Pointing to Safer Aviation, (January/February 2007): pp. 3-7, discloses basic techniques for conducting a forced landing without power in a light single-engine aircraft. These techniques include procedures which are preformed mostly manually or visually by the pilot, including confirming wind direction and speed, selecting a landing site and planning an approach. Such an approach generally includes a downwind leg, a base leg and a final approach. The base leg may be altered in order to adjust the height of the aircraft as required (i.e., turning away from the landing site if the aircraft is too high or turning towards the landing site if the aircraft is too low).

SUMMARY OF THE DISCLOSED TECHNIQUE

In accordance with an aspect of the disclosed technique, there is thus provided a method for autonomous safe emergency landing of a powered unmanned aerial vehicle (UAV) in the event of an engine failure. The method includes the procedure of generating a landing approach trajectory that includes: a downwind leg, initiating at an initiation point of the trajectory; an upwind leg, terminating at a selected touchdown point; and a U-turn leg, joining between the downwind leg and the upwind leg. The method further includes the procedures of directing the UAV to the initiation point to follow the downwind leg of the landing approach trajectory, and repeatedly determining a glide ratio of the UAV, based on current flight conditions of the UAV. The method further includes the procedure of repeatedly determining a current turning point along the downwind leg for landing the UAV at the selected touchdown point, the U-turn leg initiating at the current turning point, where the determination of the current turning point is based on the determined glide ratio. When the UAV arrives at the current turning point, the method further includes the procedure of directing the UAV to follow the U-turn leg and the upwind leg of the landing approach trajectory, for landing the UAV at the selected touchdown point. The procedure of repeatedly determining a current turning point may be performed each time with respect to a precedingly determined turning point. The method may further include the procedure of repeatedly determining a touchdown point corresponding to the current turning point, based on the determined glide ratio, where the procedure of determining a current turning point is performed with respect to the discrepancy between the touchdown point, that was precedingly determined in correspondence with the precedingly determined turning point, and the selected touchdown point. The method may further include the procedures of: selecting a selected touchdown point, where a determined prospective height of the UAV over the selected touchdown point is sufficient to enable the UAV to perform the safe emergency landing at the selected touchdown point, and where the prospective height is determined based on the determined glide ratio; and directing the UAV to glide towards the selected touchdown point, once the engine failure occurs. The selected touchdown point may be selected from a database that includes a collection of information relating to a plurality of touchdown points for emergency landing. The information may include: the direction of the runway on which the respective touchdown point is located, and the geographical location of the respective touchdown point. The method may further include the procedures of: determining a prospective height of the UAV over the selected touchdown point, based on the determined glide ratio; determining if gliding along a waiting trajectory is possible, based on whether the prospective height of the UAV exceeds a minimum height predefined to enable the safe emergency landing at the selected touchdown point; and directing the UAV to glide along the waiting trajectory if determined to be possible. The method may further include the procedure of generating a waiting trajectory, which includes: generating a waiting pattern located over an area in proximity of the selected touchdown point; determining a joining point along the waiting pattern; determining an exit point along the waiting pattern wherefrom the UAV can begin following the landing approach trajectory; directing the UAV to join the waiting pattern at the joining point; directing the UAV to glide along the waiting pattern; and directing the UAV to exit the waiting pattern at the exit point. The waiting pattern may be circular. The UAV may be directed to exit the waiting pattern once the UAV descends below a predefined exit height that is of sufficient height for the UAV to perform the safe emergency landing at the selected touchdown point. The waiting trajectory may be tangential to the downwind leg of the landing approach trajectory, where an exit point of the waiting trajectory and an initiation point of the landing approach trajectory are determined to be located at the tangency point of the waiting trajectory and the downwind leg. The method may further include the procedure of continuously measuring the current flight conditions with sensors mounted onboard the UAV. The flight conditions may include: location and navigation information of the UAV; level of fuel onboard the UAV; and atmospheric conditions in the vicinity of the UAV. The procedure of determining a glide ratio of the UAV may include auto-learning the glide ratio by iteratively determining the glide ratio until convergence to a definite value, where the auto-learning is at least partially empiric. The auto-learning may initiate once the UAV begins following the landing approach trajectory. The UAV may operate autonomously. The U-turn leg may be semi-circular In accordance with another aspect of the disclosed technique, there is further provided a powered unmanned aerial vehicle (UAV) operable to perform an autonomous safe emergency landing in the event of an engine failure. The UAV includes a flight control system for controlling the flight of the UAV, and a safe emergency landing system coupled with the flight control system. The flight control system includes a processing unit. The safe emergency landing system includes a storage device readable by the processing unit of the flight control system, tangibly embodying a program of instructions executable by the processing unit to perform method procedures for safe emergency landing of the unmanned aerial vehicle in the event of an engine failure. The method procedures include generating a landing approach trajectory that includes: a downwind leg, initiating at an initiation point of the trajectory; an upwind leg, terminating at a selected touchdown point; and a U-turn leg, joining between the downwind leg and the upwind leg. The method procedures further include: providing the landing approach trajectory to the flight control system, for directing the UAV to the initiation point to follow the downwind leg; and repeatedly determining a glide ratio of the UAV, based on current flight conditions of the UAV. The method procedures further include repeatedly determining a current turning point along the downwind leg for landing the UAV at the selected touchdown point, the U-turn leg initiating at the current turning point, where the determination of the current turning point is based on the determined glide ratio. The method procedures further include: repeatedly providing the current turning point to the flight control system, for directing the UAV to glide towards the current turning point; and, when the UAV arrives at the current turning point, indicating to the flight control system to direct the UAV to follow the U-turn leg and the upwind leg of the landing approach trajectory, for landing the UAV at the selected touchdown point. The flight conditions of the UAV may include: location and navigation information of the UAV, level of fuel onboard the UAV; and atmospheric conditions in the vicinity of the UAV. The UAV may further include: a sensor for continuously providing the location and navigation information; a sensor for continuously indicating the level of fuel onboard the UAV; and/or a sensor for continuously providing the atmospheric information in the vicinity of the UAV. The program of instructions of the safe emergency landing system may be executable to further perform the method procedure of repeatedly determining a touchdown point corresponding to the current turning point, based on the determined glide ratio, where the procedure of determining a current turning point is performed with respect to the discrepancy between the touchdown point that was precedingly determined in correspondence with the precedingly determined turning point and the selected touchdown point. The safe emergency landing system may be incorporated with the flight control system. The UAV may further includes a database that includes a collection of touchdown points for emergency landing of the UAV. The program of instructions of the safe emergency landing system may be executable to further perform the method procedure of selecting the selected touchdown point from the collection of touchdown points, where a determined prospective height of the UAV over the selected touchdown point is sufficient to enable the UAV to perform the safe emergency landing at the selected touchdown point, and where the prospective height is determined based on the determined glide ratio. The program of instructions of the emergency landing system may be executable to further perform the method procedures of: determining a prospective height of the UAV over the selected touchdown point, based on the determined glide ratio; determining if gliding along a waiting trajectory is possible, based on whether the prospective height of the UAV exceeds a minimum height predefined to enable the safe emergency landing at the selected touchdown point; and indicating to the flight control system to direct the UAV to glide along the waiting trajectory if determined to be possible. The program of instructions of the emergency landing system may be executable to further perform the method procedure of generating the waiting trajectory, which includes the sub-procedures of: generating a waiting pattern located over an area in proximity of the selected touchdown point; determining a joining point along the waiting pattern; and determining an exit point along the waiting pattern wherefrom the UAV can begin following the landing approach trajectory. The method procedure may further include providing the generated waiting trajectory to the flight control system for directing the UAV to join the waiting pattern at the joining point, to glide along the waiting pattern, and to exit the waiting pattern at the exit point. The method procedure of determining a glide ratio of the UAV may include auto-learning the glide ratio by iteratively determining the glide ratio until convergence to a definite value, where the auto-learning is at least partially empiric.

In accordance with a further aspect of the disclosed technique, there is thus provided a system for mounting on a powered unmanned aerial vehicle (UAV) to allow safe emergency landing of the UAV in the event of an engine failure. The system is coupled with a flight control system of the UAV. The system includes a storage device readable by a processing unit of the flight control system, tangibly embodying a program of instructions executable by the processing unit to perform method procedures. The method procedures include generating a landing approach trajectory that includes: a downwind leg, initiating at an initiation point of the trajectory; an upwind leg, terminating at a selected touchdown point; and a U-turn leg, joining between the downwind leg and the upwind leg. The method procedures further include providing the landing approach trajectory to the flight control system, for directing the UAV to the initiation point and to follow the downwind leg, and repeatedly determining a glide ratio of the UAV, based on current flight conditions of the UAV. The method procedures further include repeatedly determining a current turning point along the downwind leg for landing the UAV at the selected touchdown point, the U-turn leg initiating at the current turning point, where the determination of the current turning point is based on the determined glide ratio. The method procedures further include repeatedly providing the current turning point to the flight control system, for directing the UAV to glide towards the current turning point; and, when the UAV arrives at the current turning point, indicating to the flight control system to direct the UAV to follow the U-turn leg and the upwind leg of the landing approach trajectory, for landing the UAV at the selected touchdown point.

BRIEF DESCRIPTION OF THE DRAWINGS

The disclosed technique will be understood and appreciated more fully from the following detailed description taken in conjunction with the drawings in which:

FIG. 2A is a schematic illustration of a top view of a UAV having an engine failure gliding along a trombone landing approach trajectory, constructed and operative in accordance with an embodiment of the disclosed technique;

FIG. 2B is a side view schematic illustration of the UAV of FIG. 2A gliding along the trombone landing approach trajectory;

DETAILED DESCRIPTION OF THE EMBODIMENTS

Figure 1:
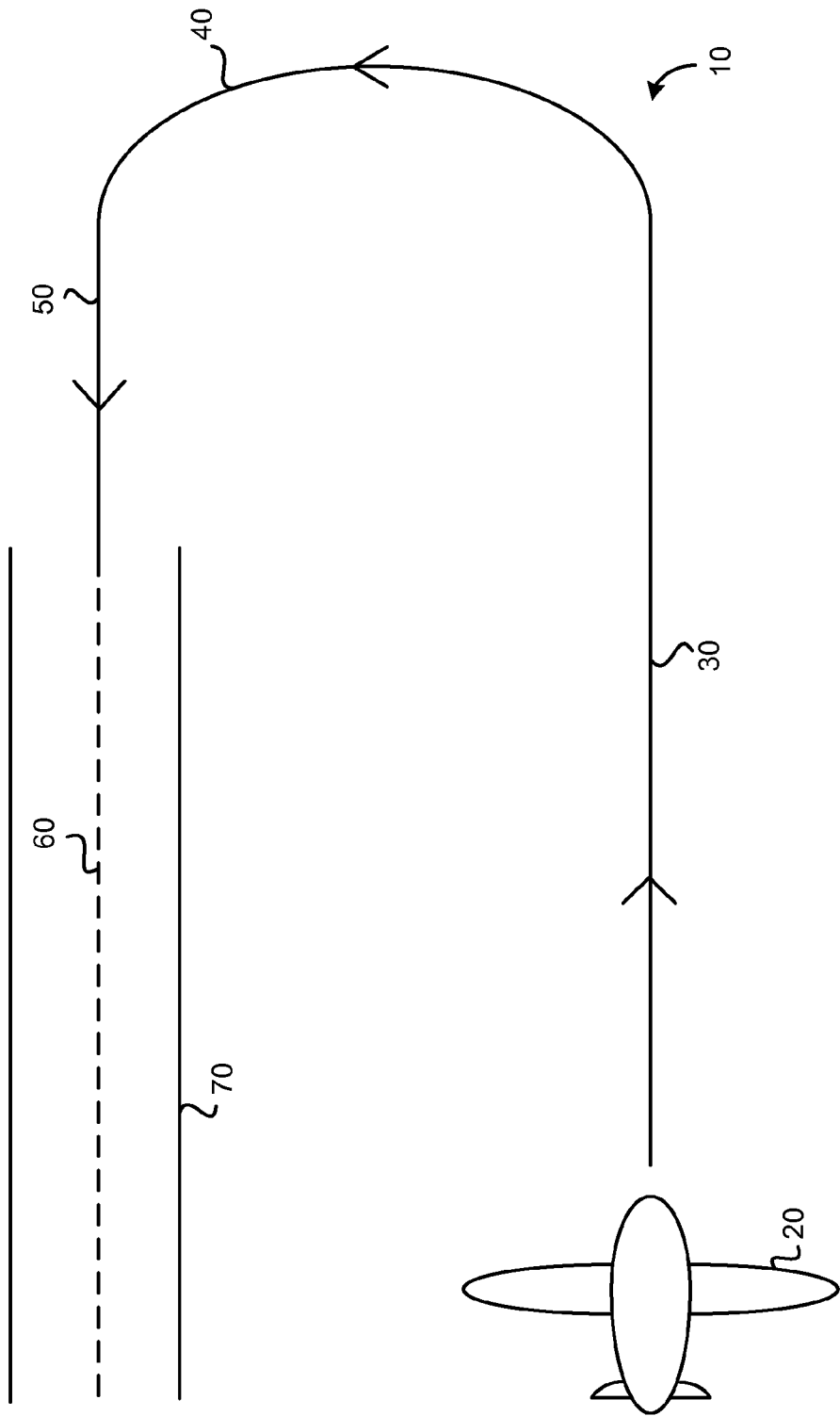
FIG. 1 is a top view schematic illustration of a trombone landing approach as is known in the prior art.

The disclosed technique overcomes the disadvantages of the prior art by providing a system and method which enables the autonomous safe landing of a UAV at a selected touchdown point, in the event of an engine failure. The system and method of the disclosed technique enables a UAV, either remotely piloted or autonomously operated, to land safely without endangering the surrounding population and with minimal damage, if at all, to the UAV and its onboard systems. In general, the system and method of the disclosed technique allows such a safe landing by utilizing a landing approach, known as a "trombone approach", which is adjusted and enhanced in real-time, dependent on the current flight conditions of the UAV and its determined glide ratio. The determination of the UAV glide ratio is performed in an iterative manner and in real-time by an auto-learning tool to provide a specific and relatively accurate ratio. The determination of the actual glide ratio and the generation of specific trombone type trajectories, which are adjusted according to the current flight conditions, allow the UAV to land in a selected touchdown point in a highly accurate manner.

The term "aircraft" as used herein encompasses manned and unmanned aircrafts, including UAVs. The term "UAV" as used herein encompasses powered unmanned aircrafts, including remotely controlled UAVs or autonomously operated UAVs. The term "U-turn" as used herein refers to a substantially 180° turn, which may follow a semi-circular path (i.e., in the shape of a half circle), but not necessarily, and may, for example, include straight segments. The term "horizontal", and its inflections, as used herein refer to a horizontal direction with respect to the Earth's surface. The terms "continuously" and "repeatedly", and their inflections, used herein as descriptive terms of an operation or a process according to the disclosed technique, may refer to continuous or repeated operations or processes which are performed at least once and at constant or variable time intervals, unless indicated otherwise. The term "flight conditions" as used herein may refer to atmospheric conditions, such as air temperature, air density or air pressure and wind direction and velocity, and to conditions related to the UAV, such as total weight (i.e., including fuel weight) and altitude of the UAV. The term "altitude" as used herein refers to the vertical distance above sea level. The term "height" as used herein refers to the vertical distance above the Earth's terrain, usually above a touchdown point unless indicated otherwise. The term "once" as used herein to describe the relative timing between two events, may refer to an event that occurs simultaneously to the other event or at some time prior to or following the occurrence of the other event. The phrase "landing at a touchdown point", and its inflections, as used herein, refers to landing at a close proximity to the touchdown point, preferably within a predefined proximity from the touchdown point. The term "determination" and its inflections, as used herein, encompasses the operations of calculation, estimation, measurement or setting. The term "auto-learning", and its inflections, as used herein refers to an operation or process of learning in an automatic manner.

Reference is now made to FIGS. 2A and 2B, which are schematic illustrations of a UAV, generally referenced 110, undergoing an engine failure, and gliding along a trombone landing approach trajectory, generally referenced 100, constructed and operative in accordance with an embodiment of the disclosed technique. FIG. 2A is a schematic illustration of a top view of UAV 110 gliding along trombone landing approach trajectory 100. UAV 110, which is undergoing an engine failure, is gliding along trombone landing approach trajectory 100 to land on a selected touchdown point 120. Trombone landing approach trajectory 100 includes a downwind leg 150, a U-turn leg 160 and an upwind leg 170. Upwind leg 170 horizontally extends along an upwind path 130. Upwind path 130 is a substantially straight line, which intersects touchdown point 120 and is horizontally directed substantially upwind. Downwind leg 150 horizontally extends along a downwind path 140. Downwind path 140 is a substantially straight line, which is horizontally directed substantially downwind at a selected horizontal distance 135 (also designated R) from upwind path 130. Thus, downwind leg 150 and upwind leg 170 are substantially straight and in parallel. U-turn leg 160 joins between downwind leg 150 and upwind leg 170. U-turn leg 160 is semi-circular and has a horizontal turn radius 155, which is equal to R/2 and allows UAV 110 to perform a substantially 180° U-turn from downwind leg 150 to upwind leg 170. U-turn leg 160, and hence, distance 135 between upwind path 130 and downwind path 140, are restricted by a minimum turning radius of UAV 110. The term "minimum turning radius" as used herein refers to the shortest turning radius of an aircraft which allows the aircraft to perform a semi-circular U-turn. The minimum turning radius is determined according to the aircraft performance. The minimum turning radius of a UAV is therefore predefined and known.

In accordance with the disclosed technique, the length of the trombone landing approach trajectory is preferably as short as possible, since the error in touchdown (i.e., discrepancy between the actual touchdown point and the selected touchdown point) is proportional to this length. In addition, the shorter the trombone landing approach trajectory is, the closer the UAV's glide is with respect to the selected touchdown point. Gliding in close proximity to the selected touchdown point diminishes the likelihood of gliding over a heavily populated area and avoiding the risks associated therewith. Therefore, the length of the radius of a preferred semi-circular U-turn leg of a trombone landing approach trajectory according to the disclosed technique approximately equals the UAV's minimum turning radius.

A trombone landing approach trajectory according to the disclosed technique may also be rectangular, i.e., having a substantially straight U-turn leg with curved edges to allow a 180° turn from the downwind leg to the upwind leg. A UAV gliding along a rectangular trombone landing approach trajectory would glide substantially straight along the downwind leg, then turn towards the U-turn leg and glide substantially straight along the U-turn leg and then turn again towards the upwind leg. Such turns, since designated to facilitate a change of direction only, are not required to be accurate. In contrast, a semi-circular U-turn leg requires the UAV to glide accurately along a circular trajectory, therefore compelling a particularly tight flight control. On the other hand, a semi-circular U-turn leg provides better accuracy in landing (i.e., with respect to the discrepancy from the selected touchdown point) and thus also allows for shorter trajectories.

Referring now to FIG. 2B, which is a side view schematic illustration of UAV 110 gliding along trombone landing approach trajectory 100 over ground 180. As is known in the art, the descent of a gliding aircraft is generally determined by its glide ratio. Therefore, the descent profile of UAV 110, illustrated as a side view of trombone landing approach trajectory 100 in FIG. 2B, may be determined by its glide ratio, i.e., the ratio of the forward gliding distance, designated ΔS, to the downward gliding distance, designated ΔH, over the same time interval, as follows:

$$\text{Glide Ratio} = \frac{\Delta S}{\Delta H} = \cot \gamma,$$

where γ designates the glide angle. The glide ratio is equal to the lift-to-drag ratio of an aircraft when assuming constant speed and still air conditions. A glide ratio of an aircraft generally depends on its aerodynamic characteristics and on its weight. The glide ratio generally varies with the airspeed and the altitude at which the aircraft glides. The glide ratio is also affected by wind, since it changes the aircraft's ground speed (e.g., tailwind would increase the glide ratio while headwind would decrease it).

It should be noted that although U-turn leg 160 as illustrated in FIGS. 2A and 2B is a left-hand turn, a U-turn leg of a trombone landing approach trajectory according to the disclosed technique may be either a left-hand or a right-hand turn with respect to the UAV. It should be also noted that since UAV 110 is without power (due to the engine failure) and therefore glides, UAV 110 would most likely descend continuously, while converting potential energy into speed.

Figure 3A:
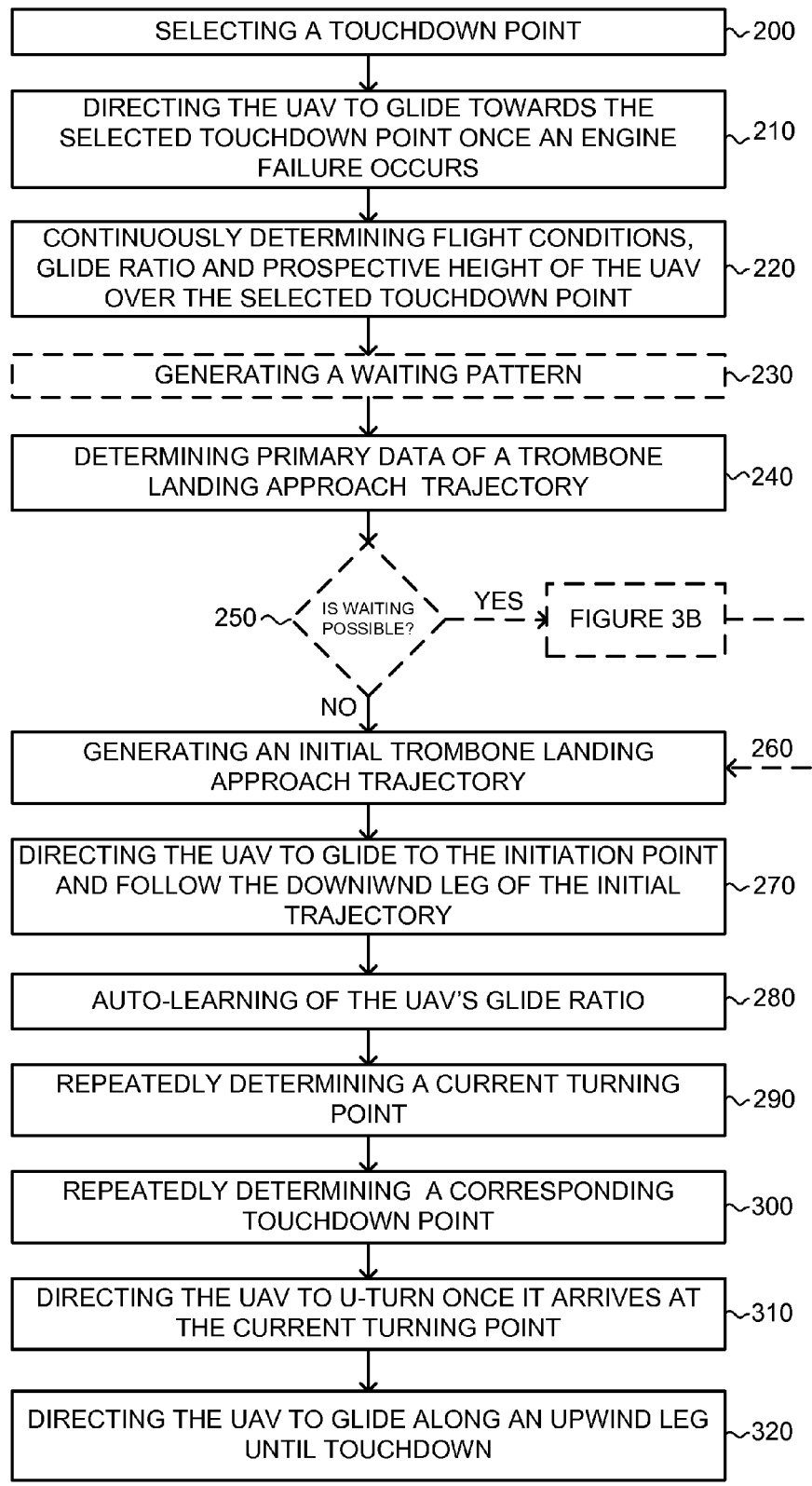
FIG. 3A is a block diagram of a method for safe emergency landing of a UAV, operative in accordance with another embodiment of the disclosed technique.
Figure 4:
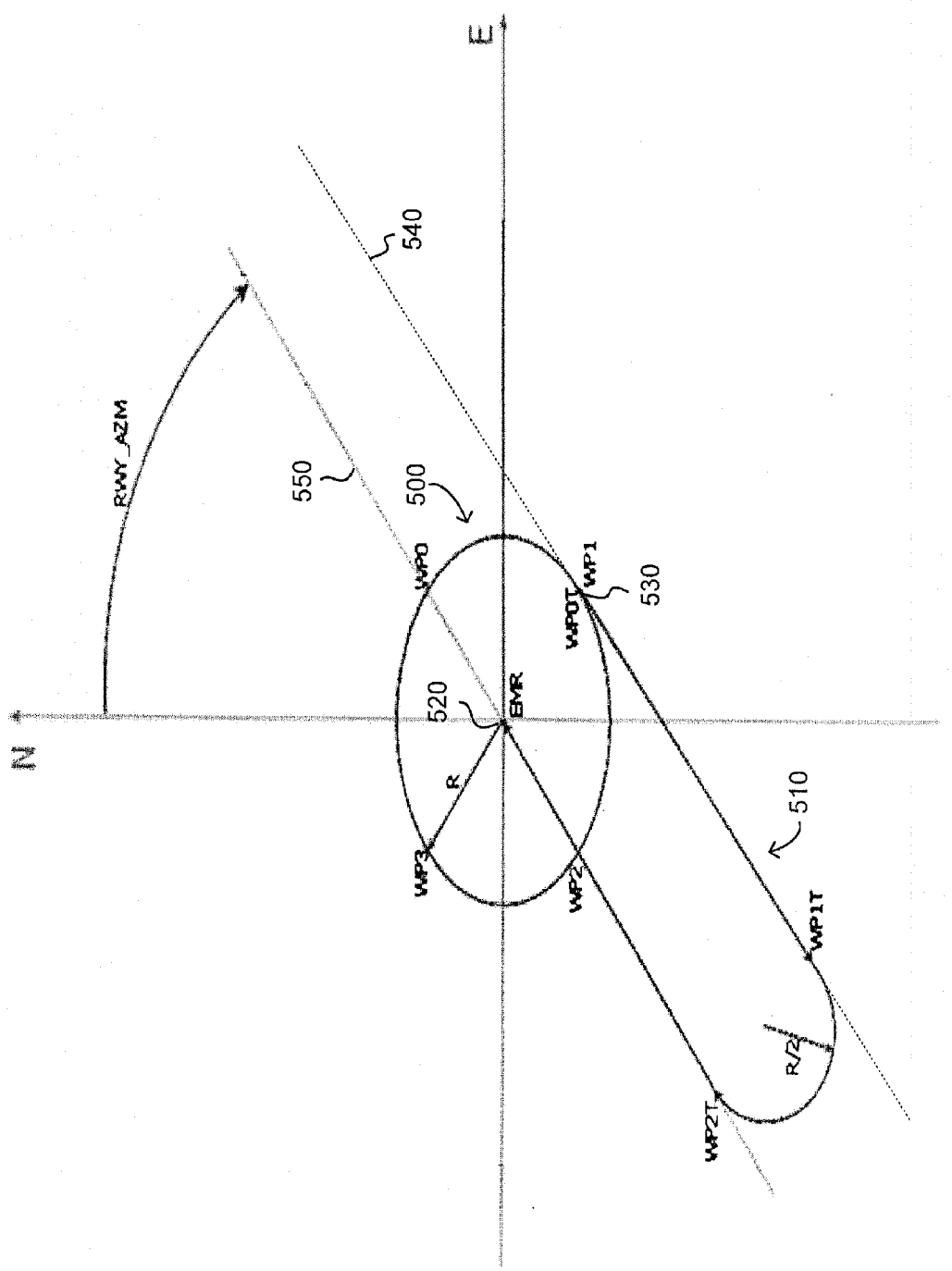
FIG. 4 is a top view schematic diagram of an exemplary waiting trajectory joined with an exemplary trombone landing approach trajectory, constructed and operative in accordance with the methods of FIGS. 3A and 3B.
Figure 5:
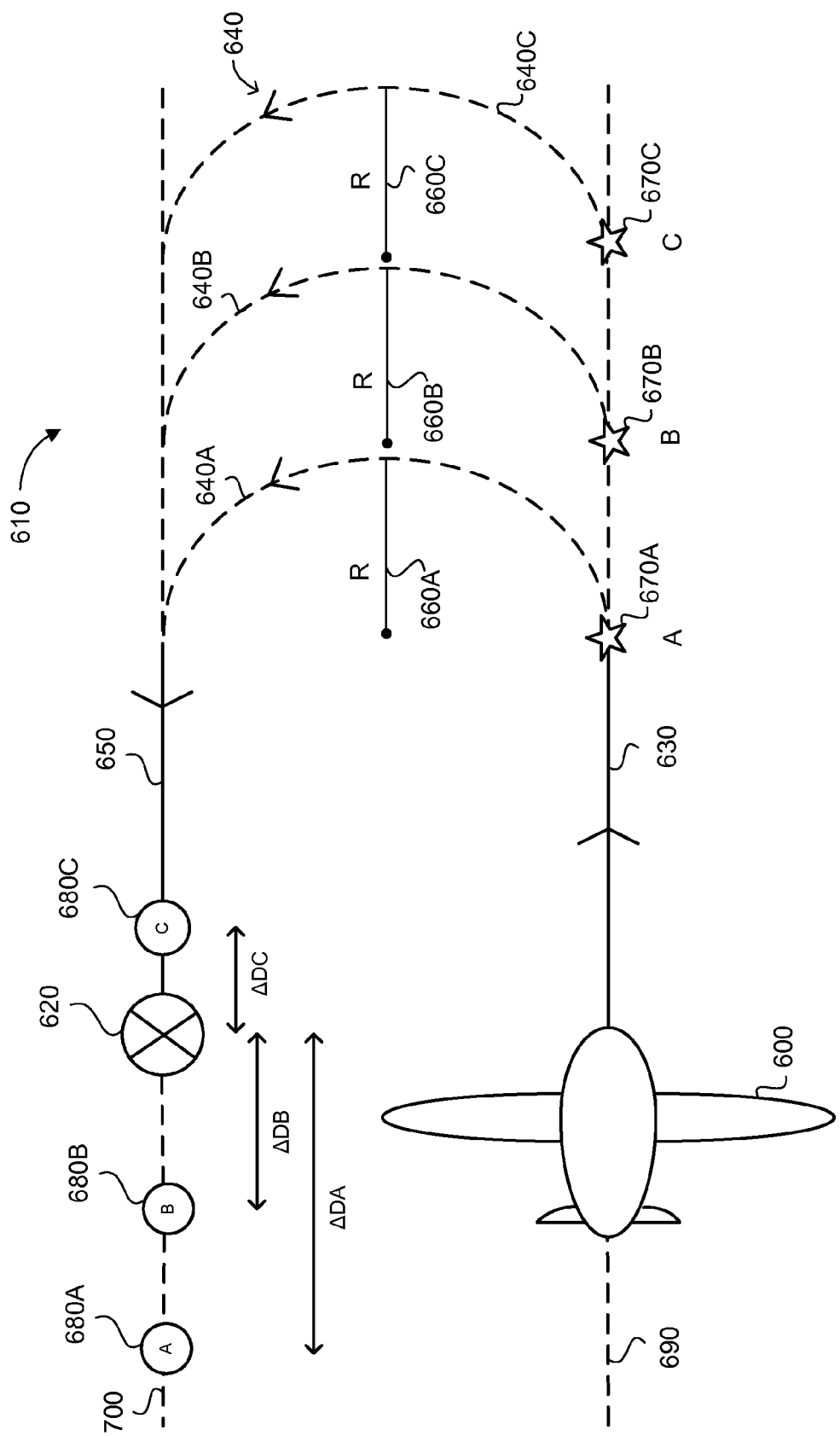
FIG. 5 is a top view schematic illustration, which visualizes a determination of a turning point for a UAV gliding along a trombone landing approach trajectory, constructed and operative in accordance with the method of FIG. 3A.

Reference is now made to FIG. 3A, which is a block diagram of a method for safe emergency landing of a UAV, operative in accordance with another embodiment of the disclosed technique. The method is further described with reference to FIGS. 4 and 5. FIG. 4 is a top view schematic diagram of an exemplary waiting trajectory, generally referenced 500, joined with an exemplary trombone landing approach trajectory, generally referenced 510, constructed and operative in accordance with the methods of FIGS. 3A and 3B. FIG. 5 is a top view schematic illustration, which visualize a determination of a turning point for a UAV, generally referenced 600, gliding along a trombone landing approach trajectory, generally referenced 610, constructed and operative in accordance with the method of FIG. 3A.

In procedure 200, a touchdown point is selected to allow a safe landing of the UAV in the event of an engine failure. The selection of a touchdown point may be performed continuously and may be initiated prior to the occurrence of an engine failure. For example, the selection of the touchdown point may be performed continuously from the beginning of the flight until an engine failure occurs. Each instantaneous selection of a touchdown point is based on the current flight conditions of the UAV, including the current location of the UAV. Alternatively, the selection of the touchdown point may be performed only after an engine failure has occurred.

The touchdown point may be selected from a database that includes relevant information, such as information relating to a collection of touchdown points for emergency landing, or digital maps. The information relating to a specific touchdown point preferably includes at least the direction of the runway on which the specific touchdown point is located, and the geographical position (i.e., longitude, latitude and altitude) of the selected touchdown point. The database may be located onboard the UAV, or at a remote location, such as a ground station. A safe touchdown point (i.e., a touchdown point enabling a safe emergency landing of the UAV) must be located at such a distance from the current location of the UAV that allows the UAV to arrive at the proximity of the touchdown point with sufficient height (i.e., potential energy) to perform a trombone landing approach according to the disclosed technique. A required minimum height may be predetermined accordingly (e.g., empirically for a specific type of UAV). The term "minimum height" as used herein refers to a threshold value for the UAV's height above a touchdown point (i.e., with respect to the altitude of the touchdown point) that indicates the minimum height required by the UAV in order to land on the respective touchdown point using a trombone landing approach according to the disclosed technique.

Determination of a prospective height of a UAV over a desired location (e.g., a possible touchdown point) according to the disclosed technique is generally performed, unless indicated otherwise, by assuming a substantially straight glide trajectory from the current location of the UAV towards the desired location and by considering the determined glide ratio of the UAV and current flight conditions.

Determination of the glide ratio of the UAV according to the disclosed technique may be performed in various degrees of precision. A relatively more precise manner to determine the glide ratio according to the disclosed technique is performed by using an auto-learning procedure, which auto learns the glide ratio of the UAV (see procedure 280 herein below). At the stage of selecting a touchdown point, it is preferable to determine the glide ratio in a manner which is relatively less precise and that is rather sufficient for this task and saves computing resources. The glide ratio determination may be performed repetitively and assumes unpowered gliding of the UAV at a predefined airspeed from the UAV's current location (i.e., longitude, latitude and altitude) and also considers the current flight conditions. The amount or weight of fuel onboard the UAV, the altitude of the UAV, the atmospheric conditions in the vicinity of the UAV, including wind direction and velocity, may be continuously measured or monitored by sensors onboard the UAV, or if possible, continuously provided by ground stations or systems located externally. The determination of the glide ratio may initiate once an engine failure occurs or prior to that, specifically as soon as the touchdown point selection procedure is activated. The term "determined glide ratio" as used herein refers to a definite value of the glide ratio, if such a definite value is provided or obtained (e.g., by using the auto-learning procedure), otherwise the term refers to the instantaneously determined glide ratio.

Once a safe touchdown point is identified, it may be immediately selected, or alternatively the selection of the touchdown point may be enhanced by performing a further procedure, which includes locating multiple possible safe touchdown points and then selecting the most suitable one. Such a touchdown point may be the point over which the determined prospective height of the UAV is greatest. A greater determined prospective height of the UAV over the selected touchdown point increases the probability that the UAV would actually arrive at the proximity of the selected touchdown point with sufficient height to perform a trombone landing approach according to the disclosed technique. Other criteria may be considered, such as the objectives of the flight mission plan, the distance between the current location of the UAV and a safe touchdown point, the time of arrival over a safe touchdown point, the wind conditions along a trajectory towards a safe touchdown point, or the extent of isolation of a safe touchdown point (e.g., distance from populated area or damageable property).

The selection of the touchdown point may be performed automatically by systems located onboard or remotely, or by a remotely located operator of the UAV. If the selection of a touchdown point is performed automatically by systems onboard the UAV, a remote operator or a remote system may monitor the selection and override the selected touchdown point if a different touchdown point is preferred. It should be noted that various systems and methods for selecting a touchdown point for an emergency landing of an aircraft are known in the art and may be incorporated into and/or implemented according to the disclosed technique.

In procedure 210, once an engine failure occurs, the UAV is directed to glide towards the currently selected touchdown point. If a touchdown point was not selected prior to the occurrence of the engine failure, then selection of a touchdown point according to procedure 200 is performed preceding procedure 210. The UAV is preferably directed to glide along a substantially straight trajectory towards the selected touchdown point and at a predefined airspeed corresponding to its current total weight.

In procedure 220, the UAV's flight conditions, glide ratio and prospective height over the selected touchdown point are continuously determined. The continuous determination of the prospective height of the UAV over the selected touchdown point is performed on the basis of the determined glide ratio and current flight conditions.

An optional abort procedure may be performed at this stage in the event that the determined prospective height of the UAV over the selected touchdown point falls below the minimum height, such that the UAV can no longer perform a trombone landing approach according to the disclosed technique. Alternatively, such an abort procedure may be activated in the event that the UAV's current altitude (as continuously monitored by the UAV's flight systems) is such that its current height falls below the minimum height. The abort procedure may include directing the UAV to perform an emergency landing as is known in the art. If the UAV is remotely operated, the operator may be notified of such an event and may direct the UAV towards a different touchdown point that may substantially enable emergency landing.

Figure 3B:
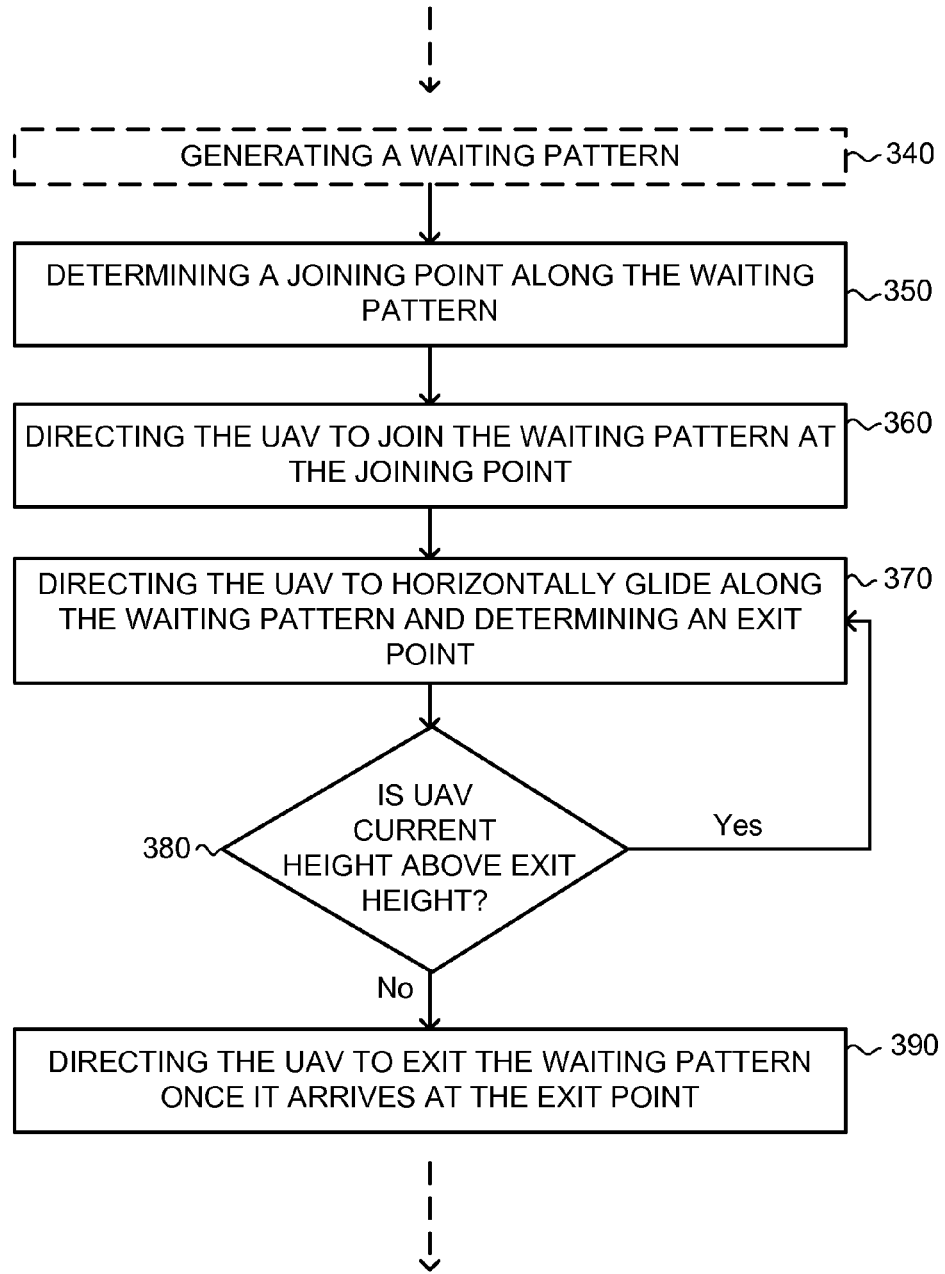
FIG. 3B is a block diagram of a method for generating and gliding along a waiting trajectory to be joined with a trombone landing approach trajectory in accordance with the method of FIG. 3A.

In general, procedure 220 initiates (wholly or partially, depending on the specific requirements), at the latest, once the procedure of selecting a touchdown point (i.e., procedure 200) is activated, and is continuously performed during the implementation of the methods of FIGS. 3A and 3B.

In procedure 230, a waiting pattern is generated. This procedure may be performed in later stages of the method, e.g., before or after considering the possibility of a waiting trajectory (i.e., procedure 250), or as part of the method for generating and gliding along a waiting trajectory (e.g., procedure 340 of FIG. 3B). The waiting pattern may be used if decreased height of the UAV is desired before performing a trombone landing approach according to the disclosed technique. The UAV may decrease its height during a waiting period in which it glides along a waiting trajectory.

A waiting trajectory according to the disclosed technique includes a waiting pattern, a joining point and an exit point. The waiting pattern defines the shape, size and position with respect to the selected touchdown point of a waiting trajectory according to the disclosed technique. The waiting pattern is preferably circular. The waiting pattern is positioned over an area in proximity to the selected touchdown point and preferably surrounds the selected touchdown point and such that the center of the waiting pattern is located substantially above the selected touchdown point. Various shapes or patterns of a waiting trajectory may be used, such as patterns that are substantially square-shaped, or patterns that do not necessarily surround the selected touchdown point. The minimum circular waiting pattern, which the UAV may follow, is a circle having a radius which is equal to the minimum turning radius of the UAV. In addition, a preferable waiting pattern is tangential to a downwind path of the trombone landing approach trajectory, in order to enable the UAV to immediately begin to follow the trombone landing approach trajectory as soon as it exits the waiting trajectory. Otherwise, the use of an auxiliary trajectory would be required in order to enable the UAV to arrive at the initiation point of the trombone landing approach trajectory in a suitable orientation to follow the trombone landing trajectory. The waiting pattern of a UAV may be predefined. Alternatively, selection of the most suitable pattern from several optional patterns, by considering current flight conditions or other relevant criteria, may be performed.

With reference to FIG. 4, waiting trajectory 500 has a circular waiting pattern (not indicated) which surrounds selected touchdown point 520 (also indicated "EMR") such that touchdown point 520 is located at the center of the circular waiting pattern. The radius of the waiting pattern equals twice the turning radius of the UAV (indicated R/2), and is indicated R accordingly. The circular waiting pattern may be generated by defining four waypoints: WP1, WP2, WP3, and WP4, which equally divides the circular pattern into four arcs of 90°.

Another desirable configuration of a waiting pattern is a circular waiting pattern with a radius approximately equal to the UAV turning radius. A smaller radius provides a shorter waiting trajectory, which may be more beneficial according to the disclosed technique (e.g., providing greater landing accuracy or closer proximity to the selected touchdown point). Referring back to FIG. 4, such a waiting pattern would have a radius which is equal to R/2. In addition, such a waiting trajectory would preferably pass over the selected touchdown point.

In procedure 240, primary data for generating a trombone landing approach trajectory according to the disclosed technique (referred to herein as "primary trombone trajectory data"), is determined. The primary trombone trajectory data includes at least a turning radius, a downwind path and an initiation point. The turning radius of the UAV may be predefined. As indicated above, a preferable turning radius approximately equals the UAV's minimum turning radius. The downwind path is a horizontal path, which is substantially straight and in parallel with the runway on which the selected touchdown point is located. The downwind path defines the horizontal direction or path along which the UAV glides when traversing the downwind leg of the trombone landing approach trajectory. The downwind path is substantially horizontally located at a distance from the selected touchdown point substantially equal to twice the turning radius, to allow the UAV to U-turn from the downwind path and glide at a straight trajectory towards the selected touchdown point (i.e., along an upwind path).

An upwind path may also be determined as part of this procedure. The upwind path defines the horizontal direction or path along which the UAV glides after U-turning towards the selected touchdown point when traversing the upwind leg of the trombone landing approach trajectory. The upwind path is a horizontal path, which is substantially straight and substantially extends along the centerline of the runway on which the selected touchdown point is located (e.g., centerline 60 of FIG. 1) and such that it horizontally intersects the selected touchdown point. Therefore, the upwind path is substantially parallel to the downwind path and the turning radius determines the distance between the downwind path and the upwind path. The downwind path is directed downwind and the upwind path is directed upwind. The downwind and upwind directions are defined with respect to the orientation of the runway on which the selected touchdown point is located. Thus, one direction of the runway is determined to be the downwind direction and the opposite direction is determined to be the upwind direction. According to the disclosed technique (e.g., procedure 220), the wind direction is continuously provided or determined (e.g., based on a continuous measurement of airspeed and groundspeed). Thus, the upwind and downwind directions are determined based on the current wind direction and with respect to the directions defined by the runway. With reference to FIG. 4, the runway (not shown) extends between northeast and southwest (the north direction is indicated "N" and the east direction is indicated "E"). The azimuth angle of the runway is indicated "RWY_AZM". According to an exemplary wind direction, the downwind direction was determined to be southwest and the upwind direction was determined to be northeast.

The initiation point defines the location along the downwind path at which the UAV begins following a trombone landing approach trajectory and a downwind leg, accordingly. The initiation point is located substantially along the downwind path and preferably in the vicinity of the touchdown point. In addition, the initiation point is preferably located at a tangency point of the waiting pattern and the downwind path, in order to allow the UAV to follow a trombone landing approach trajectory as soon as it exits the waiting pattern. With reference to FIG. 4, the turning radius is predefined (indicated R/2). Selected touchdown point 520 is located along an upwind path 550, which is in parallel with a downwind path 540. The distance between upwind path 550 and downwind path 540 equals twice the turning radius, accordingly indicated R. Downwind path 540 is tangent to the waiting pattern at waypoint WP1, which is determined to be initiation point 530 of trombone landing approach trajectory 510.

The determination of the primary trombone trajectory data is preferably performed once the UAV approaches the selected touchdown point, but may be performed (at least partially) at an earlier stage. A threshold value may be determined, which indicates the distance of the UAV from the selected touchdown point at which this procedure (240) should be initiated. In the event that a waiting trajectory is used, the determination of the primary trombone trajectory data or a portion of it (as required) may be performed as part of the procedures relating to the generation of or gliding along a waiting trajectory (procedure 230 or the method of FIG. 3B). It should be noted that the information represented by the downwind and upwind paths may be generated in the form of directional information only (e.g., when generating trajectories by using waypoints) or any other known form or manner.

In optional procedure 250, the possibility of employing a waiting trajectory is considered and a corresponding decision is made. A waiting trajectory may be followed by the UAV only if the determined prospective height of the UAV over the selected touchdown point exceeds the minimum height. Gliding along a waiting trajectory allows the UAV to decrease its excess height before initiating the trombone landing approach. Initiation of a trombone landing approach according to the disclosed technique with a lower height will involve a shorter landing trajectory, which would decrease the error in touchdown and would maintain the UAV at close proximity to the selected touchdown point. For each determination of the prospective height of the UAV over the selected touchdown point (procedure 220), the possibility of employing a waiting trajectory is determined. Thus, the determination of whether a waiting trajectory can be applied is performed repetitively according to the instantaneous flight conditions. If a waiting trajectory is possible, then the UAV would be directed to glide along a generated waiting trajectory. A minimum waiting height may be determined, in order to facilitate the determination of whether gliding along a waiting trajectory is possible. A minimum waiting height generally defines a threshold value of the height of the UAV with respect to the selected touchdown point, at which the UAV would have sufficient excess of height with respect to the minimal height in order to glide along a waiting trajectory. Such a minimum waiting height may be predetermined. The repetitive determination of whether a waiting trajectory is possible may be initiated when the UAV arrives at a certain distance from the selected touchdown point.

A method for generating a waiting trajectory to be joined with a trombone landing approach trajectory according to the disclosed technique is shown in FIG. 3B and described in detail herein below. Alternative methods for generating such a waiting trajectory may be used. This method may be used in the event that a waiting trajectory is possible according to procedure 250 of FIG. 3A. As previously indicated, a waiting trajectory according to the disclosed technique includes a waiting pattern, a joining point, and an exit point.

In procedure 340, a waiting pattern is generated. Procedure 340 is similar to procedure 230 of FIG. 3A and may be performed alternatively (i.e., a waiting pattern is generated only if a decision to perform a waiting trajectory is made in procedure 250 of FIG. 3A). With reference to FIG. 4, the waiting pattern is tangential to downwind path 540 at a waypoint 530 (also indicated WP1). A waiting pattern having a radius which is substantially equal to the turning radius of the UAV may be tangential to both downwind path 540 and upwind path 550 at two points: waypoint 530 and touchdown point 520, respectively.

In procedure 350, a joining point is determined along the waiting pattern. The joining point is preferably selected such that it allows the UAV to directly follow the waiting pattern without requiring adjustment of the UAV orientation. Otherwise, an additional auxiliary trajectory would be required. Furthermore, the joining point is preferably as close as possible to the UAV in order to avoid decreasing the UAV height. From a geometric point of view, the above mentioned preferable requirements may be achieved by directing the UAV to glide along a substantially straight line which is tangential to a circular waiting pattern, while the point of tangency is selected to be the joining point. The joining point may be determined at an earlier stage, e.g., as part of procedure 230 of the method of FIG. 3A. With reference to FIG. 4, a UAV arriving at the proximity of touchdown point 520 may be directed to join the waiting pattern at one of waypoints WP0, WP1, WP2 or WP3. Preferably, the closest waypoint is selected as the joining point.

In procedure 360, the UAV is directed to join the waiting pattern at the joining point. With reference to FIG. 4, the UAV may approach the waiting pattern from any direction and join it at the determined joining point (i.e., one of waypoints: WP0, WP1, WP2 or WP3, preferably the nearest one). As stated hereinabove, a smooth transition to a waiting trajectory may be performed by directing the UAV to horizontally glide along a straight trajectory which is tangential to the joining pattern at the joining point.

In procedure 370, the UAV is directed to horizontally glide along the waiting pattern and an exit point is determined. The UAV may glide only once along a waiting pattern of a waiting trajectory. Such a single glide may be performed by traversing the entire waiting pattern and then exiting once arriving at the exit point, or alternatively by simply gliding from the joining point until the exit point. Alternatively, the UAV may glide repeatedly along the waiting pattern, following a spiral trajectory due to the UAV descent. The manner of gliding (i.e., gliding once or repeatedly along the waiting pattern) may be predetermined or it may be determined in real time according to current flight conditions or predefined parameters. For example, a height threshold may be determined such that if the height of the UAV prior to joining the waiting pattern is below or equal to the threshold, the UAV is directed to glide only once along the waiting pattern. Conversely, if the height of the UAV prior to joining the waiting pattern is above the height threshold, then it is directed to glide repeatedly. Gliding repeatedly along the waiting pattern generally involves a greater height decrease, as compared to gliding only once along the waiting pattern.

The direction of the glide along the waiting pattern (i.e., clockwise or counterclockwise) and the location of the exit point, are preferably determined in accordance with the required orientation of the UAV once it exits the waiting trajectory to allow it to immediately follow the trombone landing approach trajectory. Thus, the waiting trajectory is determined such that the UAV would be oriented downwind once it exits the waiting pattern.

With reference to FIG. 4, since the circular waiting pattern is symmetric with respect to selected touchdown point 520, the gliding direction along the waiting pattern is not significant. The UAV may glide clockwise or counterclockwise along the waiting pattern and still exit downwind and at the same distance from upwind path 550. The difference between the two optional glide directions is manifested in the locations of downwind path 540, the corresponding downwind leg and exit point 530, and the direction at which the UAV would turn while performing the trombone landing approach. In FIG. 4, the downwind direction is southwest and is indicated by an arrowhead marking along downwind path 540 and the corresponding downwind leg. Downwind path 540 is located such that it is tangent to the waiting pattern at waypoint WP1, which is accordingly determined to be exit point 530. Thus, to allow the UAV to exit at exit point 530 while oriented downwind (i.e., southwest), the glide direction along the waiting pattern would be determined to be clockwise (not indicated). Accordingly, the UAV would perform a right-hand U-turn, while gliding along trombone landing approach trajectory 510. Conversely, in order for the UAV to glide counterclockwise along the waiting pattern and still exit downwind, downwind path 540 should be generated such that it would be tangent to the waiting pattern at waypoint WP3, which would then be determined to be exit point 530. Accordingly, the UAV would perform a left-hand U-turn when performing trombone landing approach trajectory 510. However, when employing a waiting pattern that does not surround the selected touchdown point, such as a circular waiting pattern having the turning radius of the UAV and intersecting the selected touchdown point, then only one glide direction would facilitate the exit of the UAV while oriented downwind. For example, and with reference to FIG. 4, such a circular waiting pattern intersecting selected touchdown point 520 and waypoint WP1 would require gliding in a clockwise direction in order to exit while oriented downwind. In such an event, the downwind and upwind directions must be determined prior to joining the waiting pattern.

In procedure 380, the current height of the UAV is repeatedly compared with an exit height. This procedure is performed only if a repetitive glide is selected, in order to determine when the UAV should exit the waiting pattern. The "exit height" represents the height at or below which the UAV is directed to exit the waiting pattern as soon as it arrives at the exit point. The value of the exit height is preferably determined to be higher than the value of the minimum height and such that the difference between the two values is larger than the determined UAV height decrease while gliding once along the waiting pattern. Thus, the UAV may exit the waiting pattern at a sufficient height to perform a trombone landing approach for landing at the selected touchdown point. Such an exit height may be predefined. If the current height of the UAV is above the exit height, then the UAV is directed to keep following the waiting pattern according to procedure 370. If the current height of the UAV is at or below the exit height, then the UAV is directed to exit the waiting pattern as soon as it arrives at the exit point according to procedure 390 (described herein below). In the event that the UAV is directed to glide along the waiting pattern only once, then procedure 380 is not performed and the UAV is directed to exit the waiting pattern once it arrives at the exit point, according to procedure 390. In such a case, the minimum height must be taken into consideration when determining the length of the waiting trajectory, in order to allow the UAV to exit the waiting trajectory at a height equal to or above the minimum height. Regardless, the difference between the value of the height of the UAV once it begins following a waiting trajectory, and the value of the minimum height, must be equal or greater than the value of a determined decrease of height of the UAV while gliding once along the waiting pattern.

In procedure 390, the UAV is directed to exit the waiting pattern once it arrives at the exit point. With reference to FIG. 4, the UAV is directed to exit waiting trajectory 500 at exit point 530, which is also the initiation point of trombone landing approach trajectory 510. Since the waiting pattern is tangential to downwind path 540 at exit point and initiation point 530, the UAV is positioned in a suitable orientation to immediately begin following downwind path 540 when exiting waiting trajectory 500. Thus, the UAV begins following trombone landing approach trajectory 510 as soon as it exits waiting trajectory 500. At this stage, the method of FIG. 3B terminates and the method of FIG. 3A resumes with procedure 260.

It should be noted that waiting patterns that do not pass through or include the initiation point of a trombone landing approach trajectory according to the disclosed technique may be used. In such a case, an auxiliary trajectory which connects the exit point of the waiting trajectory with the initiation point of the trombone landing approach trajectory must be generated and taken into consideration. In addition, such an auxiliary trajectory should allow the UAV to arrive at the initiation point at a suitable orientation to enable the UAV to follow the trombone landing approach trajectory. Furthermore, if an auxiliary trajectory is required, the height decrease of the UAV while following such a trajectory should be also considered.

In procedure 260, an initial trombone landing approach trajectory is generated. The initial trombone landing approach trajectory is generally similar to trombone landing approach trajectory 100 of FIGS. 2A and 2B. A trombone landing approach trajectory according to the disclosed technique includes an initiation point, a downwind leg, a U-turn leg, an upwind leg and a touchdown point. The initiation point, the desired touchdown point (i.e., the selected touchdown point), the turning radius and the downwind and upwind paths or directions of the trombone landing approach are already known or may be determined at this stage. Therefore, a trombone landing approach trajectory may be generated by determining a turning point, at which the UAV may turn from the downwind path to join the upwind path. The determination of a turning point defines a downwind leg and an upwind leg of the trombone landing approach trajectory. Accordingly, an initial turning point is determined, where the turning point is located along the downwind path and based on the determined prospective height of the UAV while gliding along the trombone landing approach trajectory. Thus, the initial turning point is determined and an initial trombone landing approach may be generated accordingly. If the possibility of gliding along a waiting trajectory is not considered (i.e., if procedure 250 and the method of FIG. 3B are not performed), then procedure 260 may be incorporated with procedure 240 (determining primary trombone trajectory data).

In procedure 270, the UAV is directed to glide towards the determined initiation point and to follow the downwind leg of the initial trombone landing approach trajectory. With reference to FIG. 4, the UAV is directed towards initiation point 530 of trombone landing approach trajectory 510, which is also the exit point of waiting trajectory 500. Alternatively, procedure 270 may be performed before procedure 260, by directing the UAV to glide to the initiation point and follow the downwind path. Then, an initial trombone landing approach trajectory may be generated according to procedure 260.

In procedure 280, the UAV's glide ratio is determined using an auto-learning process. During the glide along the downwind leg of the trombone landing approach trajectory a more complex and precise determination of the current glide ratio of the UAV is performed. A more precise glide ratio provides greater precision in determining the turning point and, therefore, greater precision in touchdown (with respect to the selected touchdown point). The determination is performed by using an auto-learning process which iteratively calculates the glide ratio until it substantially converges to a definite value (i.e., within a predefined error). The auto-learning of the glide ratio of the UAV is at least partially empiric. For example, the auto-learning is performed by measuring the distance travelled and the height decrease of the UAV over a particular time interval. These measurements are performed iteratively until a definite value (i.e., within a predefined error) is obtained. The repetitive calculations and measurements may be performed at constant time intervals, such as once per second. The auto-learning of the UAV's glide ratio may initiate at an earlier stage of the method, but preferably initiates once the UAV arrives at the initiation point and begins to follow the initial trombone landing approach trajectory. With reference to procedure 260, the initial turning point is preferably determined such as to allow sufficient time for auto-learning the glide ratio prior to the UAV arriving at the initial turning point. Further precision may be achieved based on the mean value of the determined altitude of the UAV while gliding along each one of the legs of the trombone landing approach trajectory (i.e., the downwind leg, the U-turn leg and the upwind leg). Since the altitude at which the UAV glides influences the value of the glide ratio (due to changes in air temperature density or pressure), the mean value of the determined altitude of the UAV at each leg may be used for adjustment of the determined glide ratio for each leg.

In procedure 290, a current turning point is repeatedly determined (i.e., multiple turning points are determined in succession for each instant over a given time period). All turning points are located along the downwind path and ahead of the current location of the UAV. The location of each turning point along the downwind path may be determined each time with respect to the location of the precedingly determined turning point. The criterion for such determination may be the discrepancy between the estimated touchdown point (i.e., determination of the actual touchdown point by estimation), namely, the touchdown point that was precedingly determined, which corresponds to the precedingly determined turning point, and the selected touchdown point. Thus, iterative determination of touchdown points and turning points is repeatedly performed in succession, until the UAV reaches the current turning point. Such a criterion may be used since there is a relationship between the location of a turning point and the location (i.e., as estimated) of its corresponding touchdown point. The determination of a corresponding touchdown point is detailed in procedure 300 herein below. In such case, the first turning point is determined with respect to the initial turning point, which is determined in procedure 260. The determination of a turning point may be performed at constant time intervals, such as once per second. The altitude of each turning point along the downwind path is determined on the basis of the determined glide ratio of the UAV.

In procedure 300, a corresponding touchdown point is repeatedly determined and for each determined turning point. The determination of the corresponding touchdown point may be performed by way of estimation. The first corresponding touchdown point is determined for, and corresponds with, the initial turning point, which was determined in procedure 260. Each turning point defines a different trombone landing approach trajectory, which includes a downwind leg and an upwind leg with different lengths. Accordingly, each trombone landing approach trajectory is anticipated to terminate at a different touchdown point. Each corresponding touchdown point may be estimated on the basis of the assumption that the UAV would turn from the downwind path to join the upwind path at the respective turning point. The estimation of the corresponding touchdown point is performed on the basis of the determined glide ratio.

Reference is now made to FIG. 5, which illustrates a UAV, referenced 600, gliding along an exemplary trombone landing approach trajectory, generally referenced 610. Trombone landing approach trajectory 610 is generally similar to trombone landing approach trajectory 100 of FIGS. 2A and 2B. Trombone landing approach trajectory 610 includes a downwind leg 630, a U-turn leg 640 and an upwind leg 650. Downwind leg 630 extends horizontally along a downwind path 690, which is substantially directed downwind. Upwind leg 650 extends horizontally along an upwind path 700, which is substantially directed upwind. Selected touchdown point 620 is located along upwind path 700. Downwind path 690 and upwind path 700 are substantially parallel. Current turning points A, B, and C along downwind path 690 are designated 670A, 670B, and 670C, respectively. Turning point 670A is the initial turning point. Each turning point 670A, 670B, and 670C determines a corresponding downwind leg along downwind path 690 (not distinctly indicated, as they overlap over leg 630), having a respective length. Each downwind leg is followed by a corresponding U-turn leg 640A, 640B, and 640C, respectively. Each U-turn leg 640A, 640B, and 640C has a turning radius 660A, 660B, and 660C, respectively. Turning radii 660A, 660B and 660C are substantially equal to a predefined turning radius of the UAV. Each U-turn leg 640A, 640B, and 640C is followed by a corresponding upwind leg (not indicated). Thus, the determination of a turning point according to the disclosed technique uniquely determines the length of the corresponding downwind leg and upwind leg, and thus uniquely determines the length of the trombone landing approach trajectory followed by the UAV. Initial turning point 670A determines the initial trombone landing approach trajectory (i.e., joined with U-turn leg 640A and the corresponding upwind leg). Touchdown points 680A, 680B, and 680C are the estimated touchdown points corresponding to turning points 670A, 670B, and 670C respectively. Initial turning point 670A is determined such as to allow sufficient time for determining the glide ratio of UAV 600 prior to the arrival of UAV 600 at initial turning point 670A. Corresponding touchdown point 680A is estimated based on the auto-learned glide ratio or the instantaneously determined glide ratio, if the procedure of auto-learning the glide ratio (procedure 280) is yet to complete. The discrepancy between corresponding touchdown point 680A and selected touchdown point 620 is determined (indicated ΔDA). Turning point 670B is determined with respect to initial turning point 670A and in view of discrepancy ΔDA. Touchdown point 680A is located beyond selected touchdown point 620 along upwind path 700, indicating that turning at initial touchdown point 670A would be too soon. Thus, another turning point 670B is determined iteratively, with regard to discrepancy ADA that was precedingly determined. Turning point 670B is located beyond initial turning point 670A along downwind path 690. As turning point 670B is determined, the location of corresponding touchdown point 680B is estimated and the discrepancy ΔDB between estimated touchdown point 680B and selected touchdown point 620 is determined. As shown, touchdown point 680B is still located beyond selected touchdown point 620 along upwind path 700. Thus, this process is repeated, and a further turning point 670C is iteratively determined with regard to discrepancy ΔDB that was precedingly determined. Turning point 670C is located beyond initial turning point 670B along downwind path 690. As turning point 670C is determined, the location of corresponding touchdown point 680C is estimated and a discrepancy ΔDC between estimated touchdown point 680C and selected touchdown point 620 is determined.

As seen in the example shown in FIG. 5, the latterly determined discrepancy ΔDC is smaller than the precedingly determined discrepancy ΔDB, which is in turn smaller than the earlier, precedingly determined, discrepancy ΔDA. A repeated procedure of adjustment of the location of a turning point (as elaborated in procedure 290) would generate a convergence of the determined corresponding touchdown point to the selected touchdown point. Thus, each corresponding touchdown point would be absolutely closer to the selected touchdown point with respect to the touchdown points corresponding to the precedingly determined turning points (a posteriorly determined touchdown point is always determined with a smaller discrepancy). Additional criteria may be used in order to enhance the convergence of the touchdown point corresponding to the currently determined turning point towards the selected touchdown point. For example, turning points that are associated with touchdown points located within a predefined range from the selected touchdown point may be determined.

The successive determination of touchdown points and turning points is cut-off when UAV 600 reaches a current turning point (which is the most updated turning point). In procedure 310, the UAV is directed to U-turn, once the UAV arrives at the currently determined turning point (herein, also—the "current" turning point), to join the upwind path. With reference to FIG. 5, point 670C is the current turning point. Therefore, if UAV 600 passes the location of turning point 670C, which is associated with estimated touchdown point 680C (and before a different turning point is determined), then UAV 600 is directed to U-turn towards and to follow upwind path 700. UAV 600 may pass the location of a turning point if it glides within a predefined distance from the turning point. Accordingly, UAV 600 would turn along corresponding U-turn leg 640C and would join upwind path 700.

In procedure 320, the UAV is directed to horizontally glide along the upwind path until touchdown. In particular, the UAV glides along the upwind leg of the trombone landing approach trajectory towards the selected touchdown point. With reference to FIG. 5, UAV 600 follows upwind path 700 to form upwind leg 650. UAV 600 follows upwind path 700 towards touchdown at selected touchdown point 620. Based on the UAV's current turning point, i.e., turning point 670C, and the determination of the corresponding touchdown point (i.e., according to procedure 300), UAV 600 is expected to land at touchdown point 680C, which is sufficiently proximate to selected touchdown point 620. Referring now back to FIG. 4, the turning point is indicated as waypoint WP1T. Thus, trombone landing approach trajectory 510 includes a downwind leg, which extends from waypoint WP0T (i.e., exit point 530) to waypoint WP1T, a U-turn leg, which extends from the turning point (i.e., waypoint WP1T) to waypoint WP2T and an upwind leg, which extends from waypoint WP2T to selected touchdown point 520. It should be noted that the aim of this method is to converge to a touchdown point, which is substantially located at the same location as the selected touchdown point, and such that the UAV would substantially land on the selected touchdown point, as presented in FIG. 4.

The procedure of selecting a touchdown point (i.e., procedure 200) may be replaced by a procedure of providing a safe touchdown point. The providing of a safe touchdown point may be performed according to any other method or by any other system for selecting a touchdown point as is known in the art. Alternatively, a remote operator may provide such a touchdown point.

The methods of FIGS. 3A and 3B may be implemented, inter alia, as part of a flight control system program of a UAV. Alternatively, the method may be integrated with an existing flight control system program and flight systems onboard the UAV.

The required parameters, such as the turning radius, the glide airspeed, the minimum height, the minimum waiting height or the distance at which a waiting pattern is generated or a waiting trajectory decision is initiated (e.g., procedure 250 of FIG. 3A), may be predefined and may be stored onboard the UAV or provided by a remote operator or systems.

It should be noted that the UAV glide is preferably controlled to avoid drift from the determined trajectories due to winds. Such control may be provided by the onboard flight systems.

The method of FIG. 3A may further include procedures relating to landing and ground maneuvering. Such procedures may include known automatic landing routines, including ground maneuvering routines, of powered aircrafts adjusted to emergency landing of unpowered UAV. Such procedures may be initiated once the UAV descends to or under a predefined height above the selected touchdown point. Such procedures may include flare, direct lift control, ground recognition and ground maneuvering as is known in the art.

Figure 6:
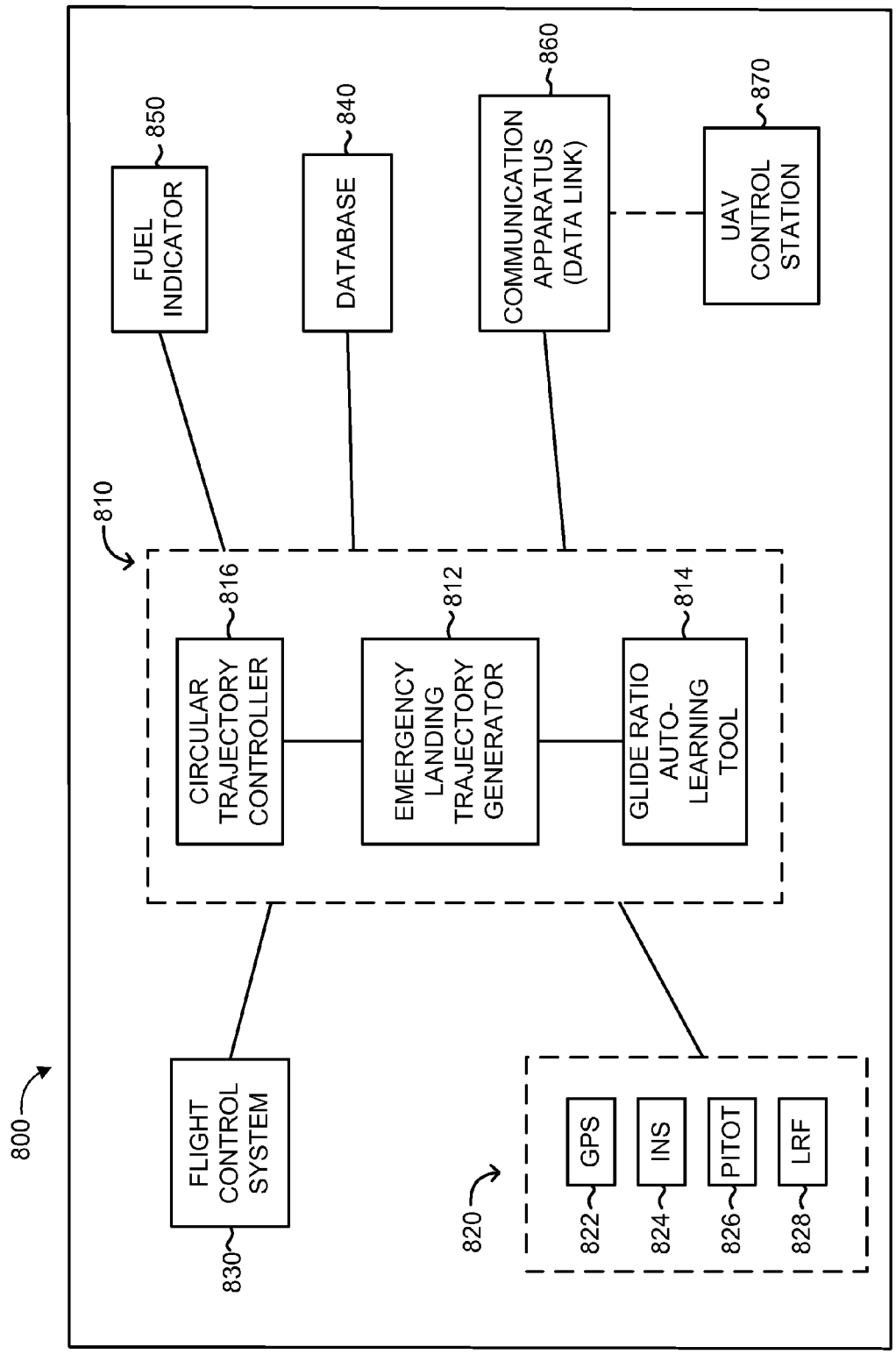
FIG. 6 is a schematic block diagram of a layout of UAV onboard flight systems, including a safe emergency landing system, constructed and operative in accordance with yet another embodiment of the disclosed technique.

FIG. 6 is a schematic block diagram of a layout, generally referenced 800, of a UAV onboard flight systems including a safe emergency landing system, constructed and operative in accordance with another embodiment of the disclosed technique. Layout 800 includes a safe emergency landing system 810, an arrangement of navigation devices and various sensors 820, a flight control system 830, a database 840, a fuel indicator 850 and a communication apparatus 860. Layout 800 includes sensors for continuously providing essential information such as current navigation and location information, current atmospheric information, and indicating current level of fuel. Emergency landing system 810 includes an emergency landing trajectory generator 812, a glide ratio auto-learning tool 814 and a circular trajectory controller 816. Arrangement 820 includes a Global Positioning System (GPS) 822, an Inertial Navigation System (INS) 824, a pitot tube 826 and a laser rangefinder (LRF) 828. It should be noted that alternative devices or sensors to the above listed devices and sensors, as is known in the art, may be used. Emergency landing system 810 may include a processing unit or a memory unit (not shown). The processing unit may be integrated with emergency landing trajectory generator 812.

Emergency landing system 810 is coupled with arrangement 820, with flight control system 830, with database 840, with fuel indicator 850 and with communication apparatus 860. Emergency landing system 810 may be coupled with the UAV onboard systems in a wired or a wireless manner. Emergency landing system 810 may be coupled with some of the UAV onboard systems indirectly, i.e., via other systems located onboard the UAV. For example, emergency landing system 810 may be coupled with arrangement 820 via flight control system 830. If so, navigation and detection data from arrangement 820 is provided to emergency landing system 810 via flight control system 830. The UAV may include a management system (not shown) which controls the different systems onboard the UAV using a centralized architecture. In such a case, emergency landing system 810 may be coupled with such a management system and may communicate with other onboard systems (all or some) via the management system. Glide ratio auto-learning tool 814 and circular trajectory controller 816 are coupled with emergency landing trajectory generator 812.

A UAV control station 870 is wirelessly coupled with communication apparatus 860, to provide the UAV with directions or required information or to monitor the flight and performance of the UAV. UAV control station 870 may be airborne or located on the ground. The communication between the UAV and the control station may be unidirectional or bidirectional. It should be noted that the system of the disclosed technique may operate autonomously and therefore may be installed and operate onboard a UAV which does not necessarily includes a communication apparatus and is not necessarily linked to a control station.

Emergency landing system 810, emergency landing trajectory generator 812 or glide ratio auto-learning tool 814 may be embodied as a readable storage device including an executable program code or instructions (e.g. executable by the processing unit or by a processing unit included in the UAV's flight control system). Emergency landing system 810 may be integrated as part of the UAV flight control systems or may be coupled with existing flight control systems.

The operation of emergency landing system 810 is generally similar and consistent with the methods described with reference to FIGS. 3A and 3B.

Emergency landing system 810 may be activated once an engine failure occurs or prior to that, for example, by repeatedly selecting a safe emergency touchdown point or repeatedly determining the glide ratio of the UAV and during the entire flight. Once an engine failure occurs or prior to that, emergency landing trajectory 812 selects a touchdown point for the safe emergency landing of the UAV. The selection of a safe touchdown point may be performed similarly to procedure 200 of FIG. 3A. Database 840 may provide emergency landing trajectory 812 with the required information regarding possible touchdown points for emergency landing of the UAV. Alternatively, such information may be provided to the emergency landing trajectory 812 by a remote controller of remote database or systems via communication apparatus 860. Database 840 or alternatively, the memory unit of emergency landing system 810, may store values of predefined parameters or any other data required for the operation of emergency landing system 810 according to the disclosed technique.

Emergency landing trajectory 812 generates a trajectory towards the selected touchdown point. The trajectory is generated in a manner, which may be similar to procedure 210 of FIG. 3A. The generated trajectory includes horizontal direction information. The generated trajectory is provided to flight control system 830, which directs the UAV to glide towards the selected touchdown point and along the generated trajectory.

Alternatively, the selection of a safe touchdown point or the generation of a trajectory towards the selected touchdown point may be performed by other onboard systems and as is known in the art. In such a case, the selected touchdown point is provided to emergency landing trajectory generator 812.

Once arriving at the proximity of the selected touchdown point, emergency landing trajectory 812 generates an initial trombone landing approach trajectory, which is similar to trombone landing approach trajectory 100 of FIGS. 2A and 2B. The generation of the initial trombone landing approach trajectory may be performed similarly to procedures 240 and 260 of FIG. 3A.

Emergency landing trajectory generator 812 may additionally generate a waiting trajectory. In such a case, emergency landing trajectory generator 812 verifies that gliding along a waiting trajectory is possible. The possibility of waiting may be verified according to procedure 250 of FIG. 3A. Emergency landing trajectory generator 812 provides flight control system 830 with the waiting trajectory information, which in turn directs the UAV to join the waiting pattern, glide along the trajectory and exit at the exit point of the generated waiting trajectory. In the event of a repetitive glide along the waiting pattern, trajectory generator 816 may indicate to flight control system 830 when to exit the waiting pattern. A predefined exit height may be stored in database 840 or in the memory unit of system 810 and provided to trajectory generator 812. A waiting trajectory may be generated according to procedure 230 and in accordance with the method of FIG. 3B. A waiting trajectory may be alternatively generated or the waiting glide may be controlled by systems onboard the UAV other than emergency landing system 810 and as is known in the art.

Circular trajectory controller 816 is optional and may be used when circular trajectories, including trajectories which form a portion of a circle (e.g., semi-circular) or which are partially circular (i.e., including segments which are portions of a circle), are generated and used by safe emergency landing system 810. Circular trajectory controller 816 activates a particular tight control to allow the UAV to follow a circular trajectory in a relatively precise manner.

The information regarding the generated initial trombone landing approach trajectory is provided to flight control system 830, which directs the UAV to glide to the initiation point and follow the generated initial trajectory.

Glide ratio auto-learning tool 814 repeatedly determines the glide ratio of the UAV and may determine it in various degrees of precision. Glide ratio auto-learning tool 814 continuously provides the instantaneously determined glide ratio to trajectory generator 812. Trajectory generator 812 continuously determines the prospective height of the UAV (e.g., above a possible or selected touchdown point) based on the current determined value of the glide ratio as provided by auto-learning tool 814.

Glide ratio auto-learning tool 814 continuously receives location (i.e., including altitude), orientation, airspeed and groundspeed information of the UAV based on location and navigation data continuously provided by GPS 822 and INS 824 and air pressure data continuously provided by pitot tube 826 of arrangement 820. Fuel indicator 850 may continuously provide auto-learning tool 814 with the current fuel level. The net weight (i.e., excluding fuel weight) of the UAV may be provided to auto-learning tool 814 by database 840 or by the memory unit of safe emergency landing system 810. The current total weight of the UAV may be continuously determined by auto-learning tool 814 or alternatively may be continuously provided to auto-learning tool 814 by systems onboard the UAV other than emergency landing system 810. Wind direction and velocity information is continuously determined by auto-learning tool 814 based on the current airspeed and groundspeed information or may be continuously provided to auto-learning tool 814 by systems onboard the UAV other than emergency landing system 810 (e.g., flight control system 830). Arrangement 820 may include alternative or additional measurement and detection systems or devices for providing the required measurements or information required according to the disclosed technique.

Glide ratio auto-learning tool 814 may determine the glide ratio in the manner described in procedure 220 of FIG. 3A which is less precise with respect to the disclosed technique. Auto-learning tool 814 may auto-learn the specific and current glide ratio of the UAV by using a repetitive process as described in procedure 280 of FIG. 3A. The measuring systems included in arrangement 820 of the UAV, such as GPS 822 and INS 824, may continuously provide auto-learning tool 814 empiric measurements of the distance glided forward and loss of height per time interval]. The auto-learning of the precise value of the glide ratio of the UAV is preferably performed during the glide of the UAV along the downwind leg and preferably initiates once the UAV begins to follow the initial trombone landing approach trajectory.

Emergency landing trajectory generator 812 determines the location of the touchdown point which corresponds to the initial turning point of the UAV. Trajectory generator 812 then determines the absolute discrepancy between the determined corresponding touchdown point and the selected touchdown point. Trajectory generator 812 then adjusts the location of the initial turning point according to the aforementioned determined discrepancy (procedures 290, 300 of FIG. 3A and their description in conjunction with FIG. 5). Thus, another point is determined to be the current turning point. Trajectory generator 812 repeatedly adjusts in the same manner the location of the turning point. Thus, turning points are repeatedly and successively determined, while the determined corresponding touchdown points converge to the selected touchdown point. The repeated selection of a turning point is similar to procedures 290 to 300 of FIG. 3A.

Once the UAV passes a current turning point, trajectory generator 812 indicates flight control system 830 to U-turn the UAV towards the selected touchdown point and to follow an upwind leg. By determining the actual turning point of the UAV, thus determining a U-turn leg and an upwind leg, trajectory generator 812 determines and completes the generation of the trombone landing approach trajectory to be followed in order to land substantially on the selected touchdown point. Flight control 830 then directs the UAV to turn at the selected turning point and follow the upwind leg until touchdown and according to the information provided by trajectory generator 812 of emergency landing system 810.

Communication apparatus 860 may provide emergency landing system 810 required information or directions from remote operator or remote systems located, for example, in UAV control station 870. Communication apparatus 860 may also be used to monitor the emergency landing and performance of the UAV and to intervene by providing directions including overriding directions to safe emergency landing system 810 or flight control system 830 in specific situations.

The UAV may further exercise automatic landing and ground maneuvering procedures of powered aircrafts, such as flare, direct lift control, ground recognition and ground maneuvering. When using such procedures, laser rangefinder 828 (indicated LRF), or any other alternative device for distance measurement, may continuously indicate the range from the UAV to the ground while the UAV glides along the upwind leg of a trombone landing approach trajectory according to the disclosed technique and towards touchdown. When the UAV descends to or below a predefined height above ground, automatic landing procedures may be initiated.

Safe emergency landing system 810 may include additional components which would allow performing such procedures, such as ground logic system and ground run control. Alternatively, safe emergency landing system 810 may utilize such systems onboard the UAV by adjusting their operation to the scenario of emergency landing according to the disclosed technique.

A system or method according to the disclosed technique may be integrated with a UAV which operates in an autonomous manner, which operates in a semi-autonomous manner, or which is remotely controlled. The term "semi-autonomous" as used herein refers to a UAV that may be assisted or supported by systems or by an operator, which are remotely located, and which provide the UAV with specific information or may take control of the operation of the UAV in specific situations.

The methods and systems of the disclosed technique may be assisted by different systems, such as collision avoidance systems and digital maps (e.g., digital terrain or elevation models), when selecting a touchdown point, generating trajectories or gliding, as is known in the art. Such systems and maps may be remotely located (e.g., in ground control stations) or onboard the UAV.

It will be appreciated by persons skilled in the art that the disclosed technique is not limited to what has been particularly shown and described hereinabove.

The invention claimed is:

1. A method for autonomous safe emergency landing of a powered unmanned aerial vehicle (UAV) in the event of an engine failure, the method comprising the procedures of:

generating a landing approach trajectory, comprising:
   a downwind leg, initiating at an initiation point of said trajectory, said downwind leg directed toward a first direction of a runway;
   an upwind leg, extending along said runway and terminating at a selected touchdown point located on said runway, said upwind leg being substantially parallel to said downwind leg and directed toward a second direction of said runway opposite to said first direction; and
   a U-turn leg, joining between said downwind leg and said upwind leg;
directing said UAV to said initiation point to follow said downwind leg of said landing approach trajectory;
repeatedly determining a glide ratio of said UAV, based on current flight conditions of said UAV;
repeatedly determining a current turning point along said downwind leg for landing said UAV at said selected touchdown point, said U-turn leg initiating at said current turning point, wherein the determination of said current turning point is based on the determined glide ratio and is performed each time with respect to a precedingly determined turning point;
repeatedly determining a touchdown point corresponding to said current turning point, based on said determined glide ratio, wherein said procedure of determining a current turning point is performed with respect to the discrepancy between: (i) the touchdown point that was precedingly determined in correspondence with the precedingly determined turning point, and (ii) said selected touchdown point; and
when said UAV arrives at said current turning point, directing said UAV to follow said U-turn leg and said upwind leg of said landing approach trajectory, for landing said UAV safely along said runway at said selected touchdown point.

2. The method of claim 1, further comprising the procedures of:
   selecting a selected touchdown point, wherein a determined prospective height of said UAV over said selected touchdown point is sufficient to enable said UAV to perform said safe emergency landing at said selected touchdown point, and wherein said prospective height is determined based on said determined glide ratio; and
   directing said UAV to glide towards said selected touchdown point, once said engine failure occurs.

3. The method of claim 2, wherein said selected touchdown point is selected from a database comprising a collection of information relating to a plurality of touchdown points for emergency landing, the information comprising:
   the direction of the runway on which the respective touchdown point is located; and
   the geographical location of the respective touchdown point.

4. The method of claim 1, further comprising the procedures of:
   determining a prospective height of said UAV over said selected touchdown point, based on said determined glide ratio;
   determining if gliding along a waiting trajectory is possible, based on whether the prospective height of said UAV exceeds a minimum height predefined to enable said safe emergency landing at said selected touchdown point; and
   directing said UAV to glide along said waiting trajectory if determined to be possible.

5. The method of claim 4 further comprising the procedure of:
   generating said waiting trajectory, comprising the sub-procedures of:
      generating a waiting pattern, located over an area in proximity of said selected touchdown point;
      determining a joining point along said waiting pattern;
      determining an exit point along said waiting pattern wherefrom said UAV can begin following said landing approach trajectory;
      directing said UAV to join said waiting pattern at said joining point;
      directing said UAV to glide along said waiting pattern; and
      directing said UAV to exit said waiting pattern at said exit point.

6. The method of claim 5, wherein said UAV is directed to exit said waiting pattern once said UAV descends below a predefined exit height that is of sufficient height for said UAV to perform said safe emergency landing at said selected touchdown point.

7. The method of claim 5, wherein said waiting trajectory is tangential to said downwind leg of said landing approach trajectory, and wherein an exit point of said waiting trajectory and an initiation point of said landing approach trajectory are determined to be located at the tangency point of said waiting trajectory and said downwind leg.

8. The method of claim 1, further comprising the procedure of continuously measuring said current flight conditions with sensors mounted onboard said UAV, wherein said flight conditions are selected from the list consisting of:
   location and navigation information of said UAV;
   level of fuel onboard said UAV; and
   atmospheric conditions in the vicinity of said UAV.

9. The method of claim 1, wherein said procedure of repeatedly determining a glide ratio of said UAV comprises auto-learning the glide ratio by iteratively determining said glide ratio until convergence to a definite value, wherein said auto-learning is at least partially empiric.

10. The method of claim 1, wherein said UAV operates autonomously.

11. A powered unmanned aerial vehicle (UAV) operable to perform an autonomous safe emergency landing in the event of an engine failure, said UAV comprising:
   a flight control system for controlling the flight of said UAV, said flight control system comprising a processing unit;
   a safe emergency landing system coupled with said flight control system, said safe emergency landing system comprising a storage device readable by said processing unit of said flight control system, tangibly embodying a program of instructions executable by said processing unit to perform method procedures for safe emergency landing of said unmanned aerial vehicle in the event of an engine failure, the method procedures comprising:
   generating a landing approach trajectory, comprising:
      a downwind leg, initiating at an initiation point of said trajectory, said downwind leg directed toward a first direction of a runway;
      an upwind leg, extending along said runway and terminating at a selected touchdown point located on said runway, said upwind leg being substantially parallel to said downwind leg and directed toward a second direction of said runway opposite to said first direction; and
      a U-turn leg, joining between said downwind leg and said upwind leg;

providing said landing approach trajectory to said flight control system, for directing said UAV to said initiation point to follow said downwind leg;

repeatedly determining a glide ratio of said UAV, based on current flight conditions of said UAV;

repeatedly determining a current turning point along said downwind leg for landing said UAV at said selected touchdown point, said U-turn leg initiating at said current turning point, wherein the determination of said current turning point is based on the determined glide ratio and is performed each time with respect to a precedingly determined turning point;

repeatedly determining a touchdown point corresponding to said current turning point, based on said determined glide ratio, wherein said procedure of determining a current turning point is performed with respect to the discrepancy between: (i) the touchdown point that was precedingly determined in correspondence with the precedingly determined turning point, and (ii) said selected touchdown point;

repeatedly providing said current turning point to said flight control system, for directing said UAV to glide towards said current turning point; and when said UAV arrives at said current turning point, indicating to said flight control system to direct said UAV to follow said U-turn leg and said upwind leg of said landing approach trajectory, for landing said UAV safely along said runway at said selected touchdown point.

12. The UAV of claim 11, wherein said flight conditions are selected from the list consisting of:
location and navigation information of said UAV;
level of fuel onboard said UAV; and
atmospheric conditions in the vicinity of said UAV.

13. The UAV of claim 11, further comprising at least one sensor selected from the list consisting of:
a sensor for continuously providing said location and navigation information;
a sensor for continuously indicating said level of fuel;
a sensor for continuously providing said atmospheric information.

14. The UAV of claim 11, further comprising a database comprising a collection of touchdown points for emergency landing of said UAV, wherein said program of instructions of said safe emergency landing system is executable to further perform the method procedure of selecting said selected touchdown point from said collection of touchdown points, wherein a determined prospective height of said UAV over said selected touchdown point is sufficient to enable said UAV to perform said safe emergency landing at said selected touchdown point, and wherein said prospective height is determined based on said determined glide ratio.

15. The UAV of claim 11, wherein said program of instructions of said emergency landing system is executable to further perform the method procedures of:
determining a prospective height of said UAV over said selected touchdown point, based on said determined glide ratio;
determining if gliding along a waiting trajectory is possible, based on whether the prospective height of said UAV exceeds a minimum height predefined to enable said safe emergency landing at said selected touchdown point; and
indicating to said flight control system to direct said UAV to glide along said waiting trajectory if determined to be possible.

16. The UAV of claim 15, wherein said program of instructions of said emergency landing system is executable to further perform the method procedures of:
generating said waiting trajectory, comprising the sub-procedures of:
generating a waiting pattern, located over an area in proximity of said selected touchdown point;
determining a joining point along said waiting pattern; and
determining an exit point along said waiting pattern wherefrom said UAV can begin following said landing approach trajectory;
providing the generated waiting trajectory to said flight control system for directing said UAV to join said waiting pattern at said joining point, to glide along said waiting pattern, and to exit said waiting pattern at said exit point.

17. The UAV of claim 11, wherein said method procedure of repeatedly determining a glide ratio of said UAV comprises auto-learning the glide ratio by iteratively determining said glide ratio until convergence to a definite value, wherein said auto-learning is at least partially empiric.

18. A system for mounting on a powered unmanned aerial vehicle (UAV) to allow safe emergency landing of said UAV in the event of an engine failure, said system coupled with a flight control system of said UAV, said system comprising:
a storage device readable by a processing unit of said flight control system, tangibly embodying a program of instructions executable by said processing unit to perform method procedures comprising:
generating a landing approach trajectory, comprising:
a downwind leg, initiating at an initiation point of said trajectory, said downwind leg directed toward a first direction of a runway;
an upwind leg, extending along said runway and terminating at a selected touchdown point located on said runway, said upwind leg being substantially parallel to said downwind leg and directed toward a second direction of said runway opposite to said first direction; and
a U-turn leg, joining between said downwind leg and said upwind leg;
providing said landing approach trajectory to said flight control system, for directing said UAV to said initiation point to follow said downwind leg;
repeatedly determining a glide ratio of said UAV, based on current flight conditions of said UAV;
repeatedly determining a current turning point along said downwind leg for landing said UAV at said selected touchdown point, said U-turn leg initiating at said current turning point, wherein the determination of said current turning point is based on said determined glide ratio and is performed each time with respect to a precedingly determined turning point;
repeatedly determining a touchdown point corresponding to said current turning point, based on said determined glide ratio, wherein said procedure of determining a current turning point is performed with respect to the discrepancy between: (i) the touchdown point that was precedingly determined in correspondence with the precedingly determined turning point, and (ii) said selected touchdown point;

repeatedly providing said current turning point to said flight control system, for directing said UAV to glide towards said current turning point; and when said UAV arrives at said current turning point, indicating to said flight control system to direct said UAV to follow said U-turn leg and said upwind leg of said landing approach trajectory, for landing said UAV safely along said runway at said selected touchdown point.

\* \* \* \* \*